United States Patent
Liu et al.

(10) Patent No.: US 9,791,264 B2
(45) Date of Patent: Oct. 17, 2017

(54) METHOD OF FAST AND ROBUST CAMERA LOCATION ORDERING

(71) Applicant: SONY CORPORATION, Tokyo (JP)

(72) Inventors: Cheng-Yi Liu, San Jose, CA (US); Alexander Berestov, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 378 days.

(21) Appl. No.: 14/614,224

(22) Filed: Feb. 4, 2015

(65) Prior Publication Data
US 2016/0223318 A1 Aug. 4, 2016

(51) Int. Cl.
| | | |
|---|---|---|
| *H04N 7/18* | (2006.01) | |
| *G01B 11/14* | (2006.01) | |
| *H04N 5/247* | (2006.01) | |
| *G06K 9/00* | (2006.01) | |
| *G06T 7/11* | (2017.01) | |
| *G06T 7/143* | (2017.01) | |
| *G06T 7/292* | (2017.01) | |
| *G06T 7/194* | (2017.01) | |

(52) U.S. Cl.
CPC .......... *G01B 11/14* (2013.01); *G06K 9/00744* (2013.01); *G06T 7/11* (2017.01); *G06T 7/143* (2017.01); *G06T 7/194* (2017.01); *G06T 7/292* (2017.01); *H04N 5/247* (2013.01); *G06T 2207/10016* (2013.01); *G06T 2207/20012* (2013.01); *G06T 2207/20072* (2013.01); *G06T 2207/20076* (2013.01)

(58) Field of Classification Search
CPC .......... G01B 11/14; G06T 7/11; G06T 7/292; G06T 7/194; G06T 7/143; G06T 2207/20076; G06T 2207/20072; G06T 2207/10016; G06T 2207/20012; H04N 5/247; G06K 9/00744
USPC ....................................................... 348/142
See application file for complete search history.

(56) References Cited

U.S. PATENT DOCUMENTS

| | | | |
|---|---|---|---|
| 8,121,350 B2 | 2/2012 | Klefenz | |
| 8,130,244 B2 | 3/2012 | Cooper | |
| 8,264,546 B2 | 9/2012 | Witt | |
| 2007/0279494 A1* | 12/2007 | Aman | ........... G01S 3/7864 348/169 |
| 2011/0310255 A1 | 12/2011 | Medeiros et al. | |
| 2013/0177294 A1 | 7/2013 | Kennberg | |
| 2013/0208124 A1* | 8/2013 | Boghossian | ........... H04N 7/181 348/159 |
| 2013/0272548 A1* | 10/2013 | Visser | ........... G06K 9/00624 381/122 |

* cited by examiner

*Primary Examiner* — Allen Wong
(74) *Attorney, Agent, or Firm* — Haverstock & Owens LLP

(57) ABSTRACT

A method to estimate a set of camera locations, in clockwise or counter-clockwise order, according to the videos captured by these cameras is described herein. In some embodiments, the cameras are assumed to be fixed, with no or very mild tilting angles and no rolling angles (the horizon is horizontal in each camera image). The difference of orientation (rolling angle) between each neighboring (closest) camera pair is able to be up to 45 degrees. Each camera is assumed to have overlapped views with at least one other camera. Each camera has one right neighboring camera and one left neighboring camera, except the first and the last cameras which have only one neighboring camera at one side. The locations of the cameras then are able to be expressed as a unique list counter-clockwise. The input videos are assumed to be synchronized in time.

49 Claims, 22 Drawing Sheets

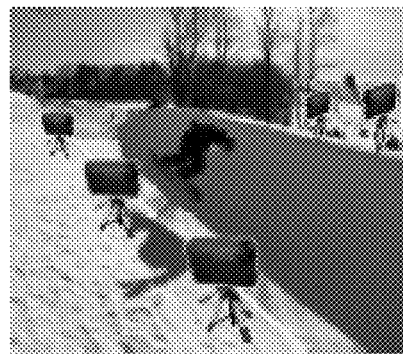
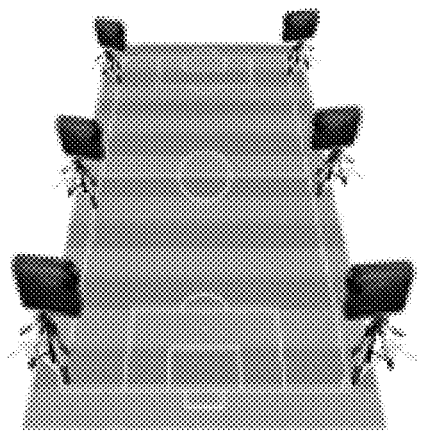
Fig. 1

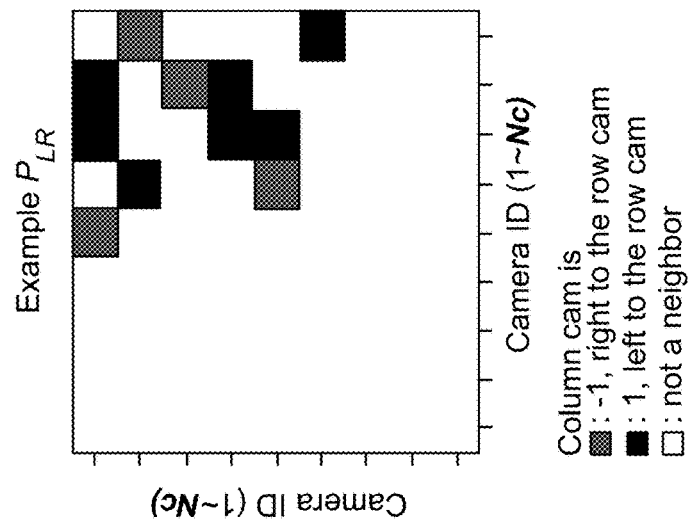
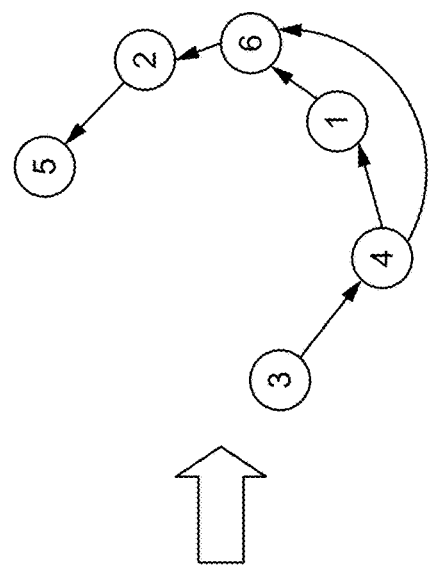
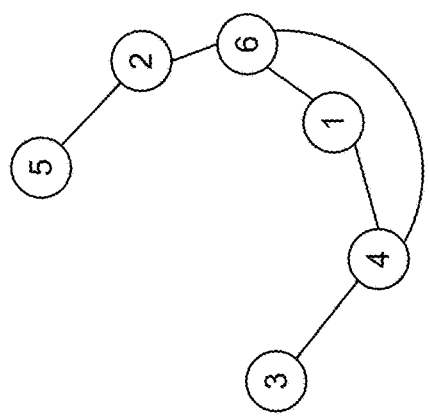
Fig. 16

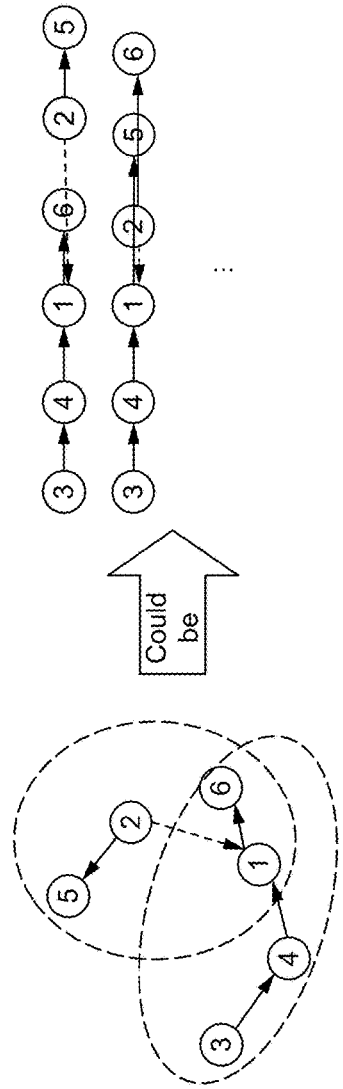
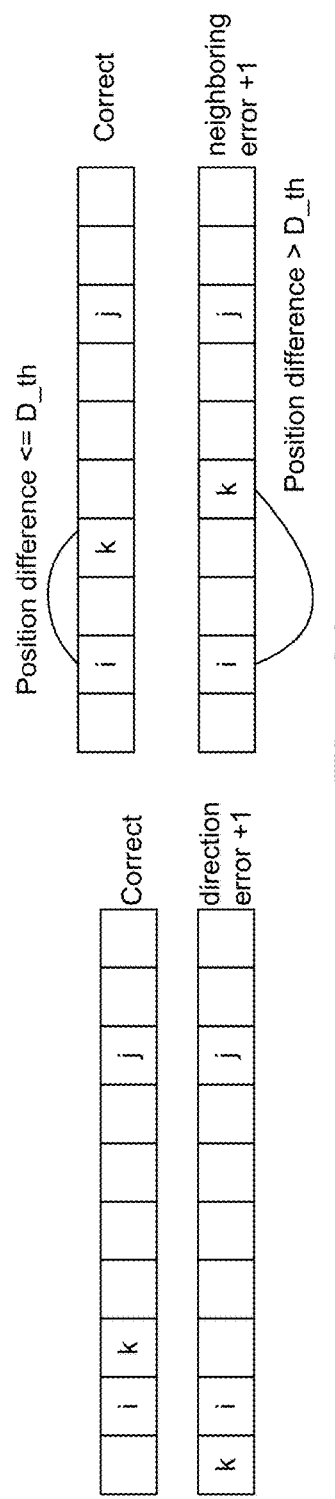
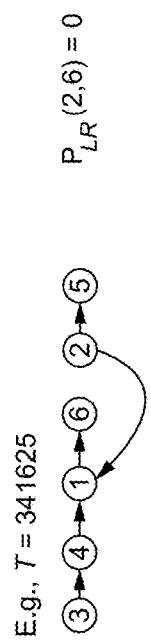
Fig. 21
Fig. 22
Fig. 23

METHOD OF FAST AND ROBUST CAMERA LOCATION ORDERING

FIELD OF THE INVENTION

The present invention relates to cameras. More specifically, the present invention relates to camera location ordering.

BACKGROUND OF THE INVENTION

Camera location ordering has been addressed under the assumption that the orientation differences between cameras are small (e.g., <15 degrees) by estimating the intrinsic and extrinsic parameters of all cameras and the found 3D keypoints. This type of method is usually called "structure from motion" (SfM) which requires intensive computation of non-linear equations and optimizations. For larger orientation differences, the mainstream method is to track and identify the common moving objects over a period of time so the relative positions between each neighboring cameras are able to be inferred.

SUMMARY OF THE INVENTION

A method to estimate a set of camera locations, in clockwise or counter-clockwise order, according to the videos captured by these cameras is described herein. In some embodiments, the cameras are assumed to be fixed, with no or very mild tilting angles and no rolling angles (the horizon is horizontal in each camera image). The difference of orientation (rolling angle) between each neighboring (closest) camera pair is able to be up to 45 degrees. Each camera is assumed to have overlapped views with at least one other camera. Each camera has one right neighboring camera and one left neighboring camera, except the first and the last cameras which have only one neighboring camera at one side. The locations of the cameras then are able to be expressed as a unique list counter-clockwise. The input videos are assumed to be synchronized in time.

In one aspect, a method programmed in a non-transitory memory of a device comprises performing background extraction, performing pairwise camera correspondence extraction, identifying neighboring cameras, determining neighboring camera positioning and performing camera list topology deduction. The method further comprises preparing settings and input. Performing background extraction includes background modeling and determining reliable moving objects. Performing background extraction generates a background extraction output including a moving object region of a camera. Performing pairwise camera correspondence extraction includes keypoint detection with subsampling, keypoint descriptor extraction and pairwise correspondence. Performing pairwise camera correspondence extraction utilizes the background extraction output and an image as input. Performing pairwise camera correspondence extraction outputs corresponding keypoints between a first camera and a second camera. Identifying neighboring cameras utilizes the keypoints between the first camera and the second camera as input. Identifying neighboring cameras outputs a binary neighboring camera map. Determining neighboring camera positioning utilizes a moving object region of a camera, corresponding keypoints between a first camera and a second camera and the binary neighboring camera map as input. Determining neighboring camera positioning outputs a neighboring camera relative direction map. Topology deduction includes relational swapping with loop resolving, nearest neighbor refinement and post-relational swapping. Topology deduction utilizes a neighboring camera relative direction map and corresponding keypoints between a first camera and a second camera as input. Topology deduction outputs a camera list topology.

In another aspect, a system comprises a plurality of camera devices each configured for capturing video content and a computing device configured for: receiving the video content, performing background extraction of the video content, performing pairwise camera correspondence extraction, identifying neighboring cameras of the plurality of camera devices, determining neighboring camera positioning and performing camera list topology deduction. The computing device is further configured for preparing settings and input. Performing background extraction includes background modeling and determining reliable moving objects. Performing background extraction generates a background extraction output including a moving object region of a camera. Performing pairwise camera correspondence extraction includes keypoint detection with subsampling, keypoint descriptor extraction and pairwise correspondence. Performing pairwise camera correspondence extraction utilizes the background extraction output and an image as input. Performing pairwise camera correspondence extraction outputs corresponding keypoints between a first camera and a second camera. Identifying neighboring cameras utilizes the keypoints between the first camera and the second camera as input. Identifying neighboring cameras outputs a binary neighboring camera map. Determining neighboring camera positioning utilizes a moving object region of a camera, corresponding keypoints between a first camera and a second camera and the binary neighboring camera map as input. Determining neighboring camera positioning outputs a neighboring camera relative direction map. Topology deduction includes relational swapping with loop resolving, nearest neighbor refinement and post-relational swapping. Topology deduction utilizes a neighboring camera relative direction map and corresponding keypoints between a first camera and a second camera as input. Topology deduction outputs a camera list topology.

In another aspect, a camera device comprises a lens, a sensor configured for acquiring video content, a non-transitory memory for storing an application, the application for: receiving the video content, performing background extraction of the video content, performing pairwise camera correspondence extraction, identifying neighboring cameras of the plurality of camera devices, determining neighboring camera positioning and performing camera list topology deduction and a processing component coupled to the memory, the processing component configured for processing the application. The application is further configured for preparing settings and input. Performing background extraction includes background modeling and determining reliable moving objects. Performing background extraction generates a background extraction output including a moving object region of a camera. Performing pairwise camera correspondence extraction includes keypoint detection with subsampling, keypoint descriptor extraction and pairwise correspondence. Performing pairwise camera correspondence extraction utilizes the background extraction output and an image as input. Performing pairwise camera correspondence extraction outputs corresponding keypoints between a first camera and a second camera. Identifying neighboring cameras utilizes the keypoints between the first camera and the second camera as input. Identifying neighboring cameras outputs a binary neighboring camera map.

Determining neighboring camera positioning utilizes a moving object region of a camera, corresponding keypoints between a first camera and a second camera and the binary neighboring camera map as input. Determining neighboring camera positioning outputs a neighboring camera relative direction map. Topology deduction includes relational swapping with loop resolving, nearest neighbor refinement and post-relational swapping. Topology deduction utilizes a neighboring camera relative direction map and corresponding keypoints between a first camera and a second camera as input. Topology deduction outputs a camera list topology.

BRIEF DESCRIPTION OF THE DRAWINGS

FIG. 1 illustrates exemplary configurations of multiple camera configurations according to some embodiments.

FIG. 16 illustrates a diagram of an undirected graph to a directed graph according to some embodiments.

FIG. 21 illustrates a diagram of neighbor refinement according to some embodiments.

FIG. 22 illustrates a diagram of neighbor refinement according to some embodiments.

FIG. 23 illustrates a diagram indicating missing data according to some embodiments.

DETAILED DESCRIPTION OF THE PREFERRED EMBODIMENT

Figure 2:
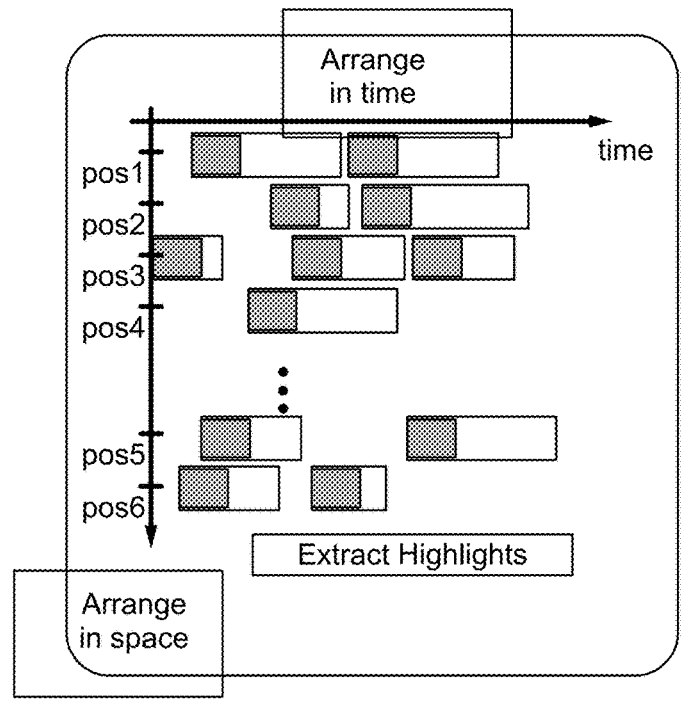
FIG. 2 illustrates an exemplary diagram of arranging the video content from the multiple video cameras in time and space according to some embodiments.

A method to estimate a set of camera locations, in clockwise or counter-clockwise order, according to the videos captured by these cameras is described herein. In some embodiments, the cameras are assumed to be fixed, with no or very mild tilting angles and no rolling angles (the horizon is horizontal in each camera image). In some embodiments, the difference of orientation (rolling angle) between each neighboring (closest) camera pair is able to be up to 45 degrees. Each camera is assumed to have overlapped views with at least one other camera. Each camera has one right neighboring camera and one left neighboring camera, except the first and the last cameras which have only one neighboring camera at one side. The locations of the cameras then are able to be expressed as a unique list counter-clockwise. The input videos are assumed to be synchronized in time.

Only using the corresponding points or patches between all combinations of the camera pairs, the method performs: (1) neighboring camera identification to narrow down the following computation, (2) neighboring camera positioning to mark the left/right relation between each neighboring camera pairs, and (3) global camera list topology deduction according to the local pairwise directions, which includes error detection and recovery to tolerate few erroneous camera pair relations. The method is fast because it does not contain complicated camera parameter estimation. It is also robust due to the error detection/recovery mechanism of the method.

Instead of a complicated estimation of the entire 3D points and the camera parameters, a simpler method and features which are sufficient to identify the ordering of cameras at large orientation differences is described. Although moving objects are able to be helpful to this problem, the method is able to handle the condition without moving objects in the scene.

Assuming there are N cameras, the camera location ordering method includes:

1. Fast neighboring camera identification performs the complete comparison O(N^2) in this component and benefits with computational efficiency.
2. Fast neighboring camera positioning (Left/Right) by the difference of motion flows between the moving objects and the background. The method is very simple, fast, and again there is no explicit parameter estimation.
3. Global camera list topology deduction by a few number of neighboring camera relations with error detection and recovery. The method is a swapping-based sequencing constrained by the neighboring camera information. It includes resolving the loop conditions which could not be handled by the original swapping algorithm. The method also detects and recovers the missing camera pairs so the final solution is globally optimal.

Additionally, there is no estimate of the camera and 3D point parameters as performed by the conventional methods; rather, statistical information is utilized.

Fast neighboring camera identification by the goodness of correspondence has a cross-validation step, and global camera list topology deduction is able to detect errors, recover errors, and compute the missing data. Both are robust to erroneous input.

Fast neighboring camera positioning is able to compute the left/right relation solely based on the background information as long as the neighboring cameras are not facing outward (very few overlaps).

The methods described herein are able to be applied to (1) interactive camera selection to view the same event from different viewing angles, (2) automatic camera network organization in video surveillance, (3) automatic organization of video stocks according to their captured locations, and (4) as a preprocessing stage before SfM to achieve a faster camera network positioning, which is able to be use in 3D sports video, view interpolation and point clouds generation.

Background/Moving object extraction by a GMM-based background modeling over a short video duration (20 seconds) is able to be utilized. Other methods which extract the pixels of moving objects are also able to be used.

Fast camera pair correspondence using the existing keypoint methods such as SIFT, SURF, BRISK, or FREAK are able to be utilized. SIFT and SURF generate a grid around a keypoint and divide each grid cell into sub-grids. At each sub-grid cell, the gradient is calculated and is binned by angle into a histogram whose counts are increased by the magnitude of the gradient, all weighted by a Gaussian. BRISK is a 512 bit binary descriptor that computes the weighted Gaussian average over a select pattern of points near the keypoint. Values of specific pairs of Gaussian windows are compared, depending on which window in the pair was greater. FREAK evaluates 43 weighted Gaussians at locations around the keypoint, but the pattern formed by the Gaussians is biologically inspired by the retinal pattern in the eye. As to keypoint detection, methods to obtain evenly distributed keypoints, such as the Grid-based keypoint sampling, are favored. Other methods providing the corresponding points/patches are also capable. If the corresponding patches with segmentation information are available, a better matching between a camera pair is able to be used. Still other methods computing the similarity between two images are able to be used to decide if two cameras are able to be considered as neighboring candidates or not.

Neighboring camera candidate cross-validation is able to be done with the k-NN relations. More complicated implementations may include bi-directional camera pair information to compute the probability of neighboring cameras.

The camera location ordering method arranges videos captured by multiple cameras by time and/or space. FIG. 1 illustrates exemplary configurations of multiple camera configurations according to some embodiments. FIG. 2 illustrates an exemplary diagram of arranging the video content from the multiple video cameras in time and space according to some embodiments.

The time-synchronized videos captured by multiple cameras are the input, and ordering of the whole cameras clockwise or counter-clockwise is the output.

Figure 3:
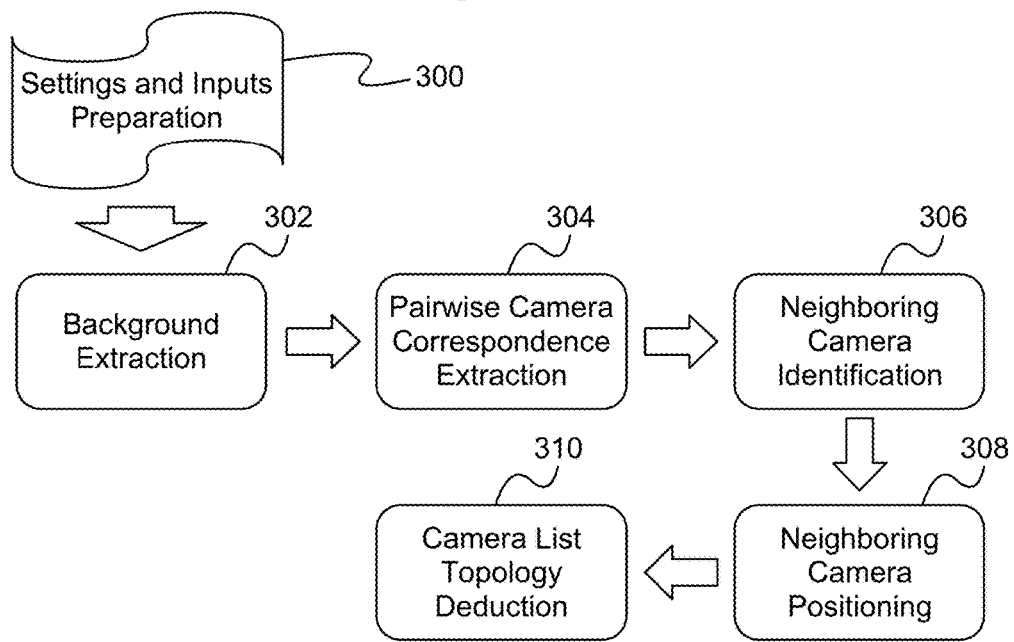
FIG. 3 illustrates a diagram of a process flow according to some embodiments.

FIG. 3 illustrates a diagram of a process flow according to some embodiments. In the step 300, settings and input are prepared. In the step 302, background extraction is performed. In the step 304, pairwise camera correspondence extraction is performed. In the step 306, neighboring cameras are identified. In the step 308, neighboring camera positioning is determined. In the step 310, camera list topology deduction is performed. In some embodiments, fewer or additional steps are implemented. In some embodiments, the order of the steps is modified. The steps are described in further detail herein.

The following is a list of notations used herein:

$N_c$: Number of cameras
$C_i$: Camera i
$N_f$: Sequence duration (in frames)
$R_i$: Moving object region (rectangles) in the image of Camera i
$\sim R_i$: Background in the image of Camera i
$K_i$: Set of keypoints of camera i
$k_{i,k}$: The j'th keypoint of camera i. A keypoint is a 4×1 vector of (x=x_coordinate, y=y_coordinate, s=scale, o=orientation).
$M_{ij}$: Set of the corresponding keypoints (correspondences) between camera i and camera j
$k_{i,m}$: Keypoint in image i of correspondence m
x: Count of discrete variable x
$M_{ij}$: Number of the corresponding keypoints between camera i and camera j
P: $N_c$ x $N_c$ binary neighboring camera map
$P_{LR}$: $N_c$ x $N_c$ neighboring camera relative direction map
T: Camera list topology (counter-clockwise)

In preprocessing, the input images of each camera are read. The background extraction step (302) uses the original RGB 24-bit images, and the pairwise camera correspondence extraction step (304) uses the grayscale (8-bit 0~255) images converted from the original RGB images.

Figure 4:
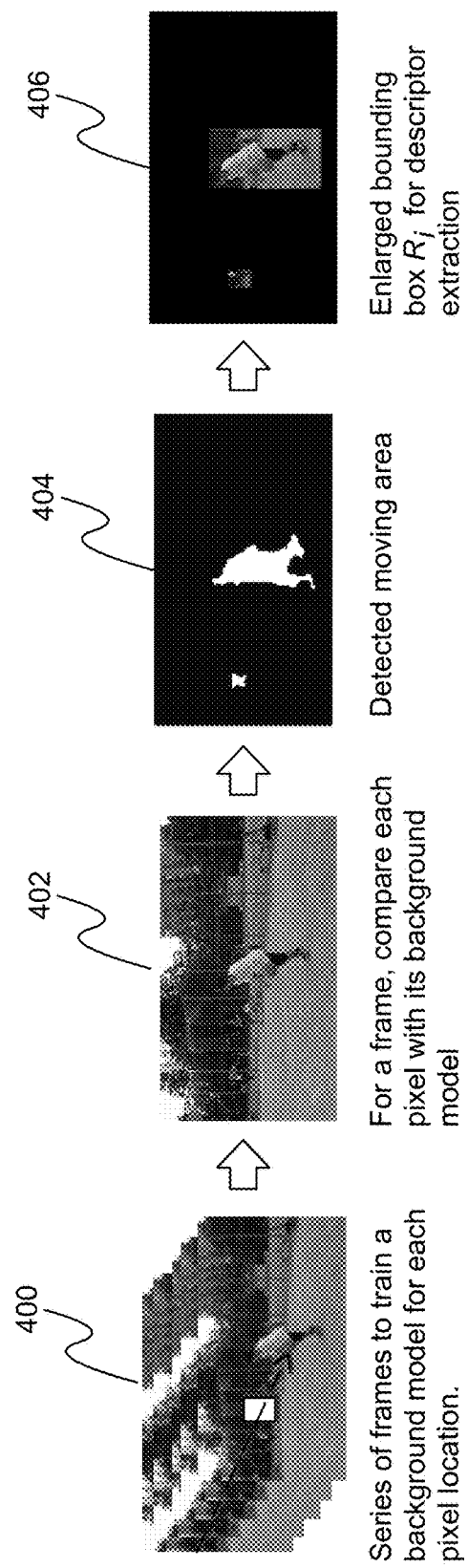
FIG. 4 illustrates images describing background extraction according to some embodiments.

The background extraction step (302) includes substeps: background modeling and reliable moving objects. The background extraction step is utilized to extract the background/moving object regions for each camera which are able to be used for applying different parameters or algorithms. FIG. 4 illustrates images describing background extraction according to some embodiments. In 400, a series of frames are used to train a background model for each pixel location. In 402, for a frame, each pixel is compared with its background model. In 404, a moving area is detected. In 406, an enlarged bounding box $R_i$ for descriptor extraction is shown.

Background modeling is utilized to build a background intensity model for each pixel so most moving objects with color difference to the background are able to be detected. The background modeling method includes generating a Gaussian Mixture Model (GMM) for each pixel. M Gaussians for each pixel are totaled. Assuming each data was drawn from a single Gaussian (exactly one of the $y_m$ from $\vec{y}$ is able to be equal to 1 and the others are zero).

$$p(\vec{x}, \vec{y}; \vec{\theta}) = p(\vec{y}; \pi_1, \ldots, \pi_M) p(\vec{x} | \vec{y}; \vec{\theta}_1, \ldots, \vec{\theta}_M)$$
$$= \prod_{m=1}^{M} \pi_m^{y_m} p_m(\vec{x}; \vec{\theta}_m)^{y_m},$$

where p is the overall posterior probability, $\vec{x}$ is data, $\vec{y}$ is the indicator of Gaussian the data is drawn from, $\pi$ is the weight of Gaussian m, $\vec{\theta}_m$ are Gaussian parameters, and $y_m$ is binary indicating whether drawn from this component or not.

An iterative algorithm for the GMM model is utilized. For initialization, there is an unknown number of Gaussian components (M), so M is made large. There are unknown parameters for each Gaussian $\vec{\theta}_m$, $\pi_m$, so a random guess is able to be used. The iterative algorithm simultaneously updates M and the parameters and penalizes complicated models (so to reduce M).

For background modeling, RGB images of time=1 ... $N_f$ are input. The GMM models are computed for all pixel locations. Any pixel i has its color model parameters, $\theta_i = \{\mu_{i,1}, \sigma_{i,1}, \mu_{i,2}, \sigma_{i,2}, \ldots \mu_{i,M}, \sigma_{i,M}\}$. For a frame to detect at time t, pixel i is a marker as foreground if p(I(i,t), <Threshold (Equation 1), where $p(i,\theta_i)$ is the probability of I(i,t), the intensity of pixel i at time t, belonging to the background. In the GMM model, Equation 1 is able to be performed by checking the squared Mahalanobis distance:

foreground if for all m=1 . . . M, $(I(i,t)-\mu_{i,m})^2 >$ Th_var$*\sigma_{i,m}^2$.

The output is h(1) ... h($N_f$), background/foreground masks for time=1 ... $N_f$. In some embodiments, t>1 is chosen after the background extraction process as the initial t=1 frame or background may not be stable yet.

The substep of reliable moving objects removes the false positive moving object regions due to abrupt camera shakes or noise. The reliable moving object substep uses durations and the motion co-occurrence in time of the moving object regions to identify the locally specific motions, based on the assumption that the true motion will be around the center of the image, there is an uneven distribution of the motion pixels.

Figure 5:
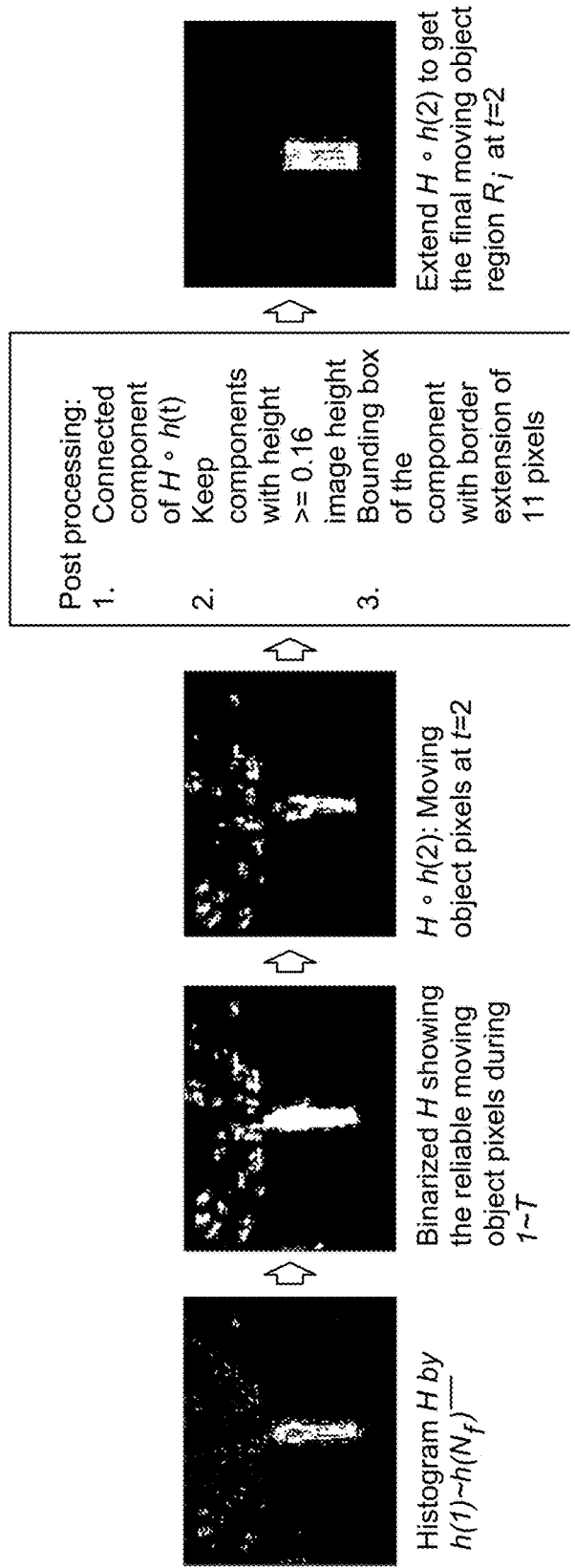
FIG. 5 illustrates a diagram of the reliable moving objects substep according to some embodiments.

FIG. 5 illustrates a diagram of the reliable moving objects substep according to some embodiments.

The input of the reliable moving objects substep receives h(1) ... h($N_f$) from the background modeling substep. An image histogram of moving object probability over time is generated. A smaller weight at time t is used if massive motion areas are detected:

$$H = \sum_{t=1}^{N_f} w(t) * h(t)$$
$$= \frac{1}{motionarea(t=1)} * h(t=1) +$$
$$\frac{1}{motionarea(t=2)} * h(t=2) + \ldots$$

H is binarized by thresholding. The output, where t is the time of frame to analyze, is $R'_i = H \circ h(t)$ where '∘' is the element-wise product operator. Post-processing is applied to $R'_i$ to get the final $R_i$.

The pairwise camera correspondence extraction step (304) includes several substeps: keypoint detection with subsampling, keypoint descriptor extraction and pairwise correspondence. The pairwise camera correspondence extraction is for extracting the corresponding points between a pair of images captured by two cameras where the corresponding points are representing the same real 3D position. The spatial distribution of corresponding points should be as even as possible.

Figure 6:
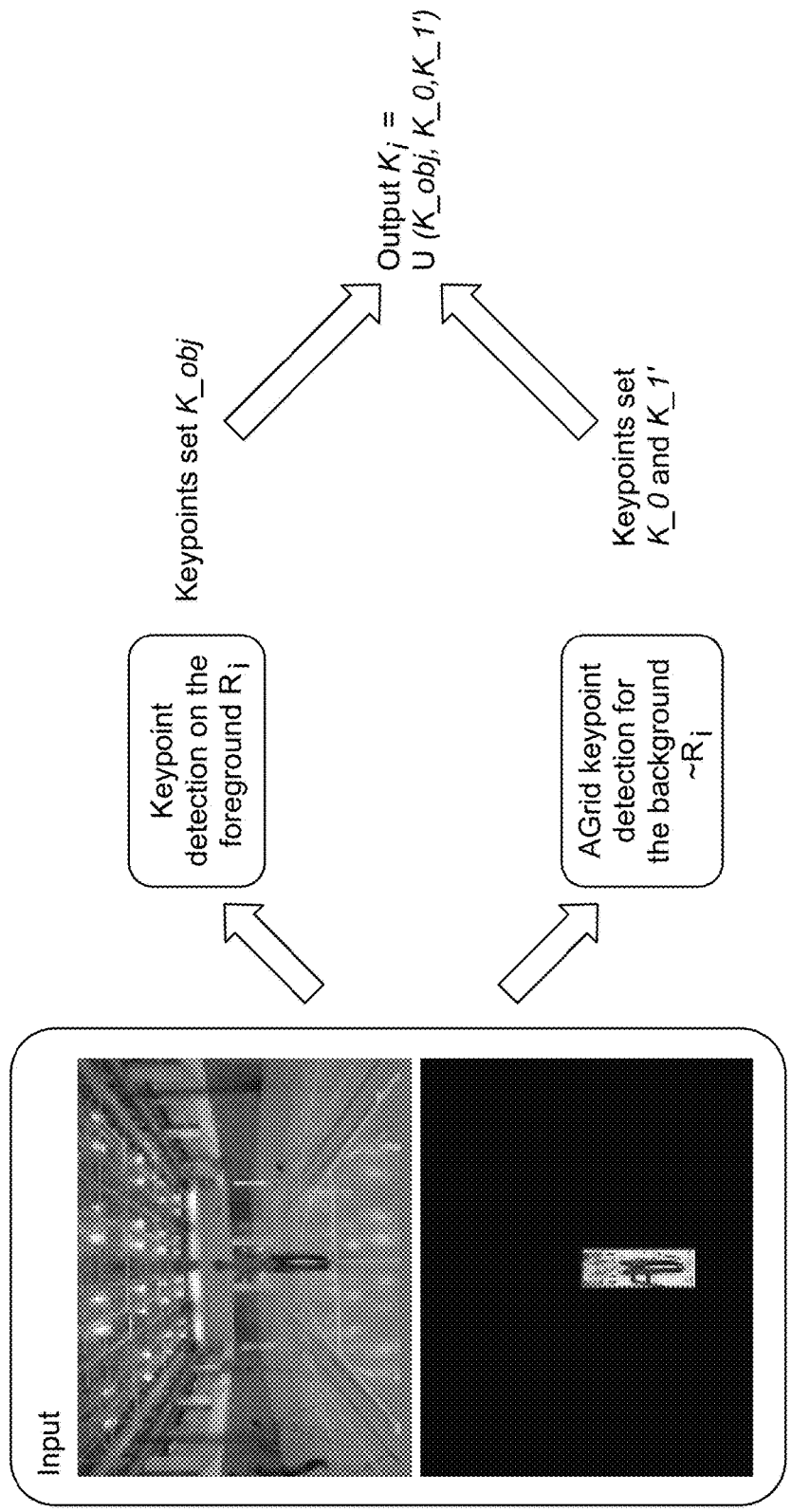
FIG. 6 illustrates a diagram of a process flow of keypoint detection according to some embodiments.

FIG. 6 illustrates a diagram of a process flow of keypoint detection according to some embodiments. Keypoint detection receives an input, performs keypoint detection on the foreground and adaptive grid keypoint detection for the background, the foreground produces a keypoints set K_obj and the background produces a keypoints set K_0 and K_1', and the output is $K_i = \cup$(K_obj, K_0, K_1'). A keypoint is a 4x1 vector of (x=x_coordinate, y=y_coordinate, s=scale, o=orientation).

Keypoint detection constrains the representative samples for correspondence matching. SIFT keypoint detection function by OpenCV is able to be used. A whole image or an image patch is input, and the output is a set of keypoints inside the input image. For example, the implementation includes scale-space extrema detection by DoG, keypoint localization, unstable points like those with low contrast or high edge responses are eliminated, and orientation is assigned.

Keypoint subsampling is utilized since the background is usually much more spread out than moving objects, and keypoint distribution to cover ~$R_i$ as complete as possible is preferred. Instead of purely adding points everywhere, the detected keypoints in the homogeneous area are representative for accurate matching using adaptive grid (AGrid) for subsampling.

Figure 7:
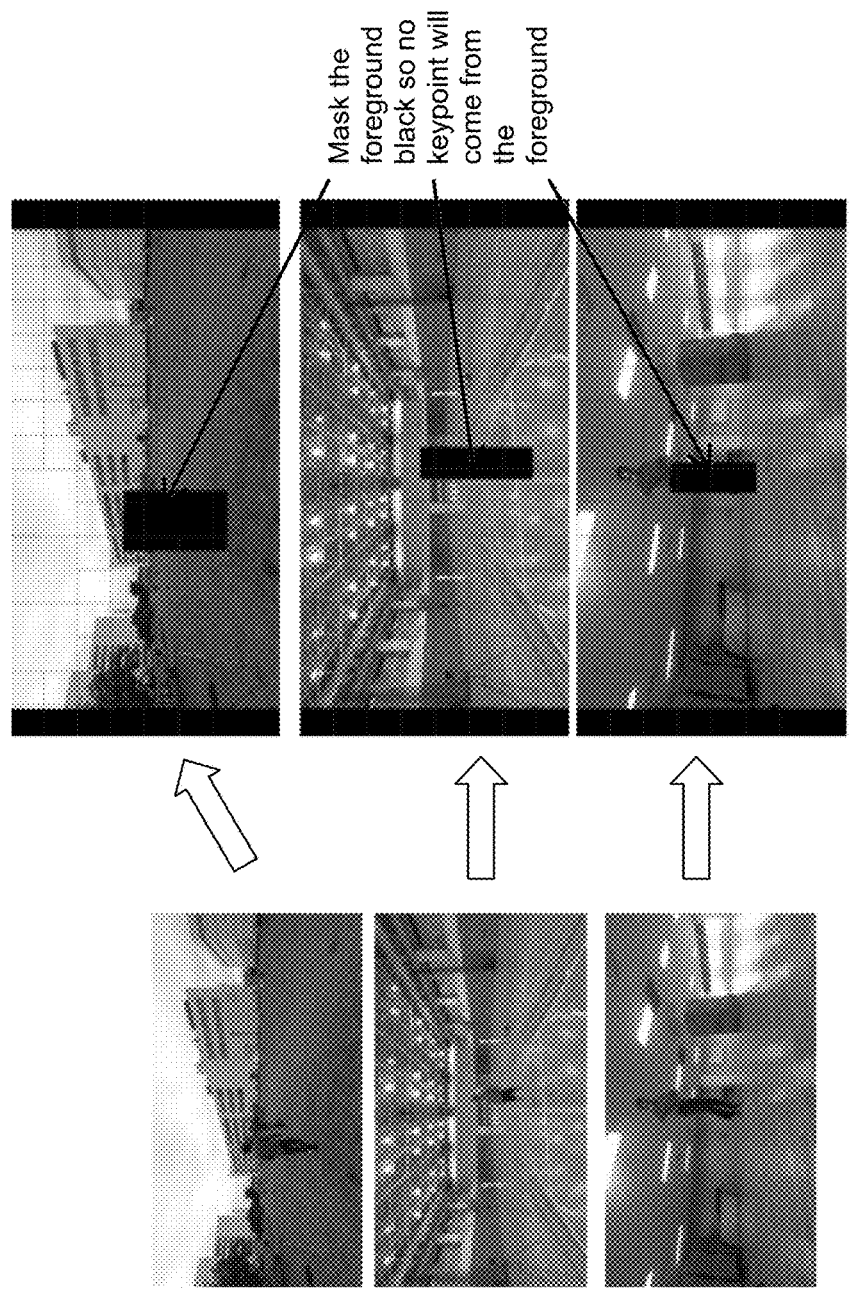
FIG. 7 illustrates images of keypoint subsampling using Agrid for background according to some embodiments.
Figure 8:
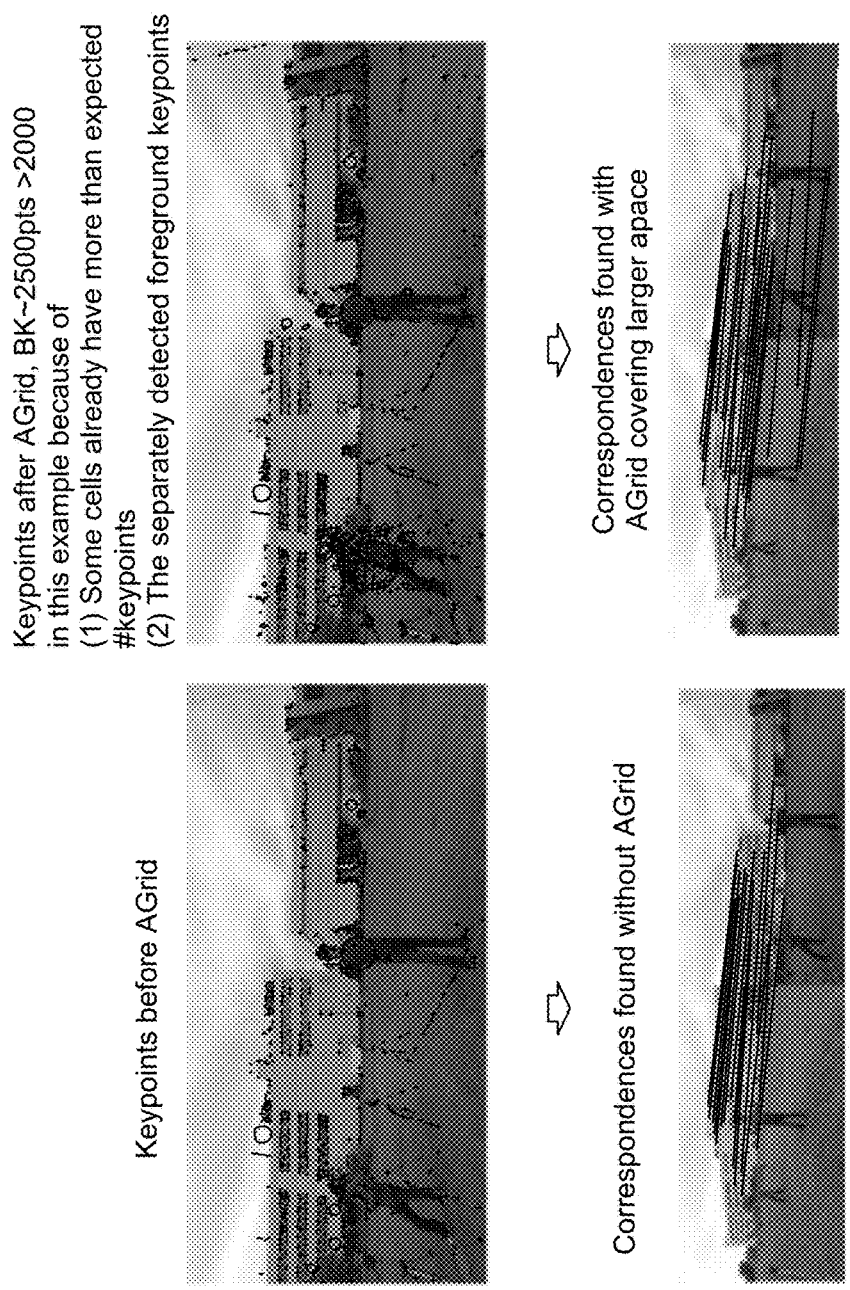
FIG. 8 illustrates images of keypoint subsampling using Agrid according to some embodiments.

FIG. 7 illustrates images of keypoint subsampling using AGrid for background according to some embodiments. FIG. 8 illustrates images of keypoint subsampling using AGrid according to some embodiments.

For keypoint subsampling, foreground and background AGrid, the input is image i and $R_i$ from the reliable moving objects substep. The foreground SIFT is used to determine K_obj for $R_i$. AGrid for the enlarged spatial keypoint distribution in ~$R_i$ includes: initially setting keypoints K_0 by SIFT detector (no grid) to obtain the keypoints in ~$R_i$ detected at the whole image scale, and starting from the whole image, quadtree decomposition is applied: divide a block if the σ of intensity>σ_th. The final divided units are referred to as "cells." Each cell has the same minimum #keypoints=Expected #keypoints/#cells. Only do a second SIFT keypoint detection for the cells not yet with enough keypoints by K_0. This gives K_1. Fill each cell to the minimum #keypoints by K_1. The keypoints used to fill are K_1'. Aggregate K_obj, K_0 and K_1' as $K_i$. The output is $K_i$ containing the location, scale and orientation information.

Keypoint descriptor extraction is used for computing a descriptor to represent each keypoint so it is able to be discriminated by the following matching. Background and the centered moving objects have different dynamic ranges of viewing angle changes because: different depth (Moving objects has similar depths to all cameras) and different FOV (Moving objects occupies smaller FOV due to our assumptions), so different descriptors are applied to different regions for better performance.

Keypoint descriptor extraction receives image i, $K_i$ from keypoint subsampling containing the keypoints of the image, and the output is descriptors of $K_i$. For moving object keypoints, $\forall k_{i,m} = (x_{i,m}, y_{i,m}, s_{i,m}, o_{i,m}) \in K_i$, $x_{i,m}$ and $y_{i,m}$ inside ~$R_i$, are determined using BRISK keypoint detector by OpenCV. Scales and orientations are from SIFT which utilized 60 sampling positions, 512 chosen pairs.

For the background regions ($\forall k_{i,m} \in K_i$, x and y coordinates of $k_{i,min}$ inside ~$R_i$), FREAK keypoint detector by OpenCV is used. Scales and orientations are from SIFT. 43 sampling positions and 512 chosen pairs are used.

Pairwise correspondence utilizes input $R_i$ from the reliable moving objects substep, descriptors of $K_i$ from keypoint descriptor extraction substep and i=1~$N_c$. The output is $M_{ij}$=correspondences between $c_i$ and $c_j$, i,j=1~$N_g$. The Hamming distance is used following the BRISK and FREAK descriptors selected:

Hamming distance H(f1,f2)=bit sum(f1⊕f2), where f1 and f2 are binary vectors (descriptors). Distance (dissimilarity) $D(k_{i,m}, k_{j,n})$ between two feature points $k_{i,m}$ and $k_{j,n}$ that are able to be defined as $H(f_{i,m}, f_{j,n})$, where $f_{i,m}, f_{j,n}$ are the descriptors of $k_{i,m}$ and $k_{j,n}$, respectively. Matching $k_{i,m}$ with $K_j$ is to find $k_{j,n^*}=\min/n\ D(k_{i,m},k_{j,n}), k_{j,n} \in Kj$
then $(k_{i,m}, k_{j,n^*})$ is a match.

Figure 9:
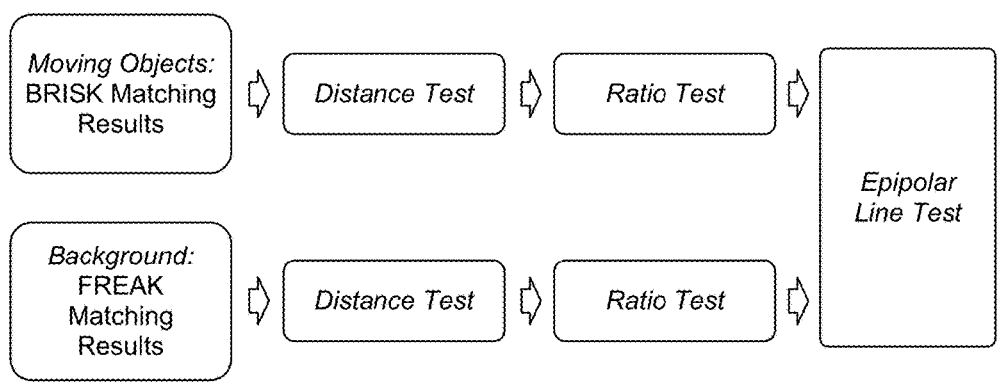
FIG. 9 illustrates a diagram of pairwise correspondence according to some embodiments.
Figure 10:
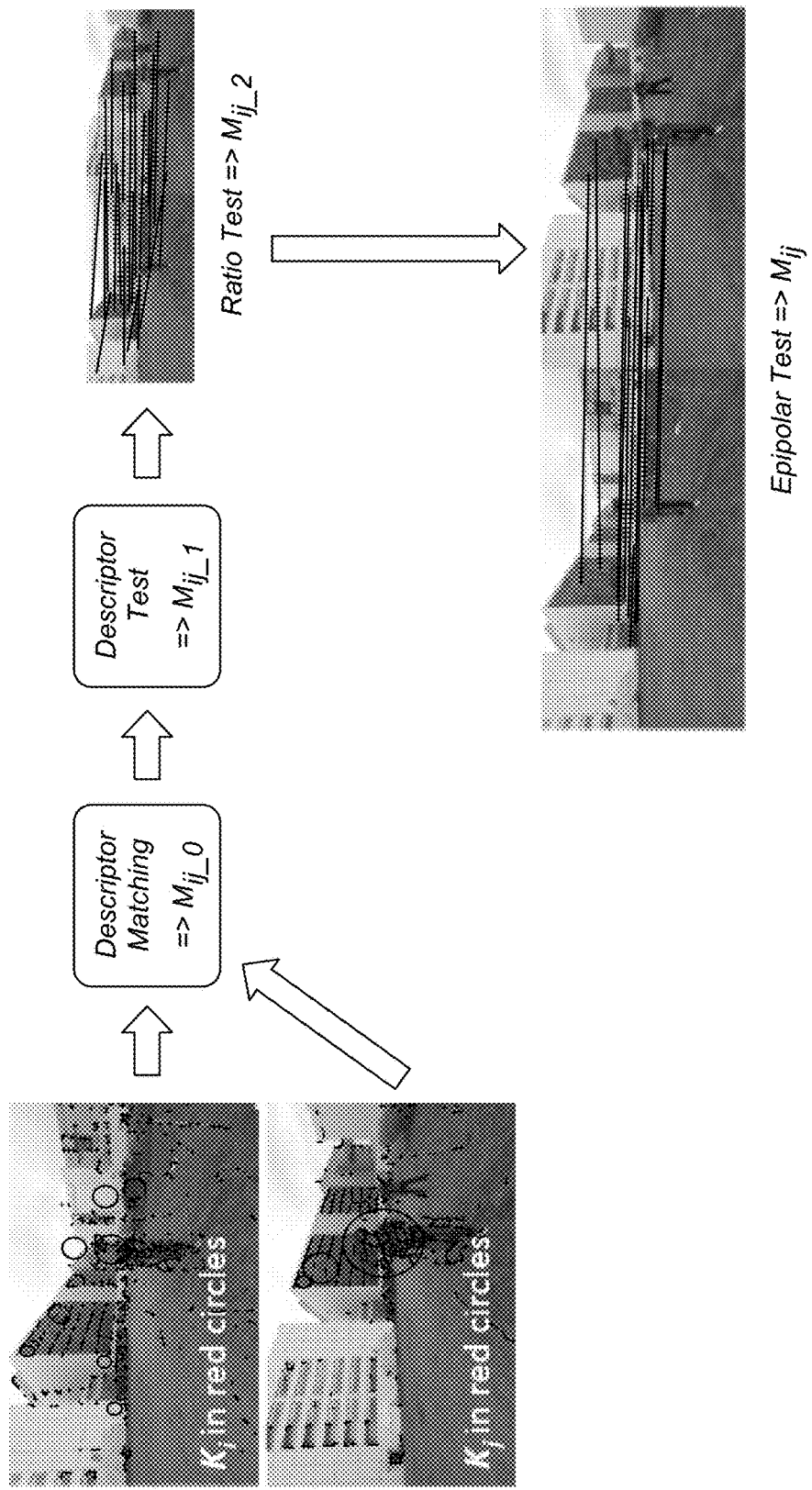
FIG. 10 illustrates a diagram of pairwise correspondence according to some embodiments.

$M_{ij\_0}$ is the set of the best matches by FREAK/BRISK Hamming distance. Three outlier removal mechanism are used: distance test, ratio test and epipolar line test. FIG. 9 illustrates a diagram of pairwise correspondence according to some embodiments. FIG. 10 illustrates a diagram of pairwise correspondence according to some embodiments.

For the pairwise correspondence, a distance test is implemented which removes the correspondences with lower descriptor matching scores (e.g., appearance), since the low descriptor matching scores highly relate to bad correspondences. $M_{ij\_0}$ is input by the FREAK/BRISK Hamming matching. The distance tests involves putting the correspondence $(k_{i,m}, k_{j,n})$ from $M_{ij\_0}$ to $M_{ij\_1}$ if $D(k_{i,m}, k_{j,n})\leq Th$, where Th=200 for both FREAK and BRISK. The output is $M_{ij\_1}$.

For the pairwise correspondence, a ratio test is implemented which retains only the good correspondences without ambiguity. This is effective for repeated patterns and remaining distinctive correspondences. 2-NN distance ration comparison is utilized. The best two matches (e.g., minimum distances) are found for a keypoint $k_{i,m}$ from $C_i$ in $C_j$: $k_{j,n}$ and $k_{j,q}$, $(k_{i,m}, k_{j,n}) \in M_{ij\_1}$. The larger the ratio, the better the discriminative power of the keypoint. The ratio test includes the correspondence $(k_{i,m}, k_{j,n})$ in $M_{ij\_2}$ if $D(k_{i,m}, k_{j,q})/D(k_{i,m}, k_{j,n})>Th$, where Th=1.3.

For pairwise correspondence, an epipolar test is implemented to remove outliers based on geometry constraints and statistics of correspondences (e.g., #inliers is larger than #outliers). The input of the epipolar test is $M_{ij\_2}$ (process background/moving objects keypoints together). The process lets F be the fundamental matrix between $C_i$ and $C_j$, and $x_i$, $x_j$ are a pair of 2D corresponding point coordinates in the images of $C_i$ and $C_j$, respectively, giving:

$$x'_i F x_j = 0$$

Figure 11:
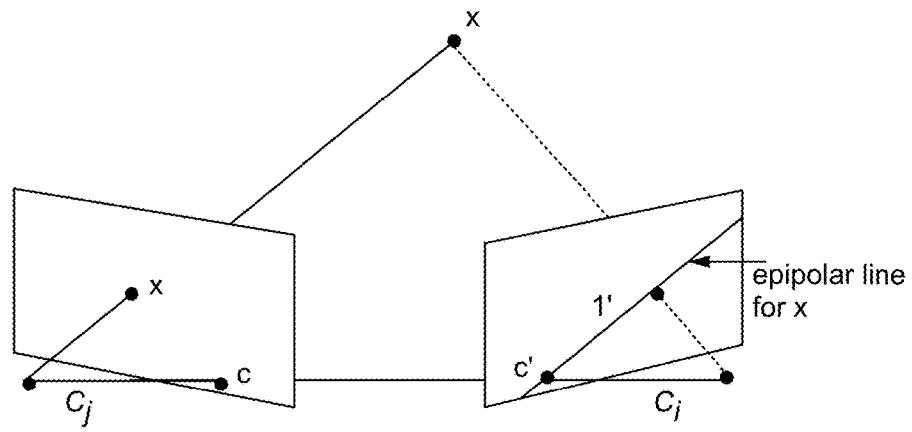
FIG. 11 illustrates a diagram of Fx defining an epipolar line in the image of $C_i$ according to some embodiments.
Figure 12:
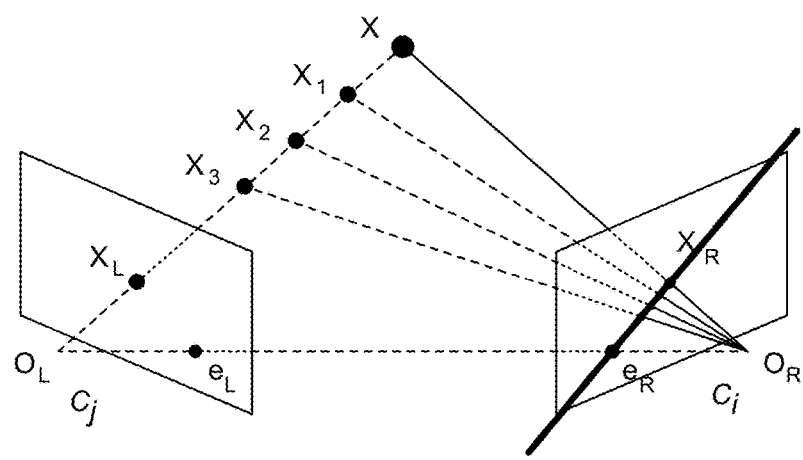
FIG. 12 illustrates a diagram of checking the point-line distance in $C_i$ and accepting the correspondences with distance$\approx$0 according to some embodiments.

For pairwise correspondence, geometrically, as $Fx_j$ defines an epipolar line in the image of $C_i$ as shown in FIG. 11, the point-line distance in $C_i$ is able to be checked, and the correspondences with distance≈0 are accepted as shown in FIG. 12.

Eight correspondences are randomly chosen to generate a hypothesis of F. The best hypothesis $\hat{F}$ is chosen with the most correspondences satisfying $x'_i \hat{F} x_j = 0$. The output of pairwise correspondence is $M_{ij}$ which are correspondences between $C_i$ and $C_j$ satisfying $\hat{F}$.

Figure 13:
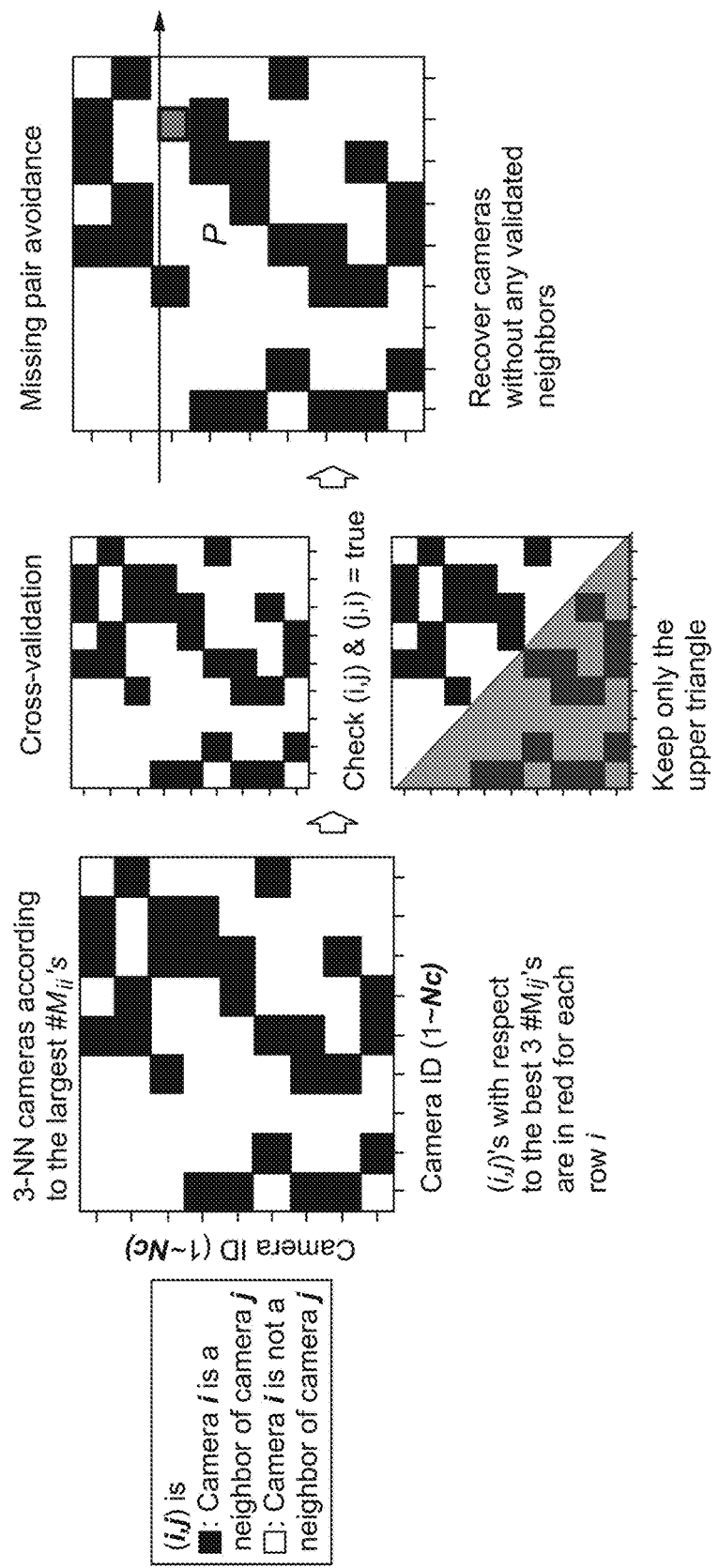
FIG. 13 illustrates a diagram of neighboring camera identification according to some embodiments.

Neighboring camera identification (306) is used to obtain the possible neighboring camera pairs to reduce the number of pairs to check in the neighboring camera position step, the camera list topology deduction step and other advanced camera network analyses. FIG. 13 illustrates a diagram of neighboring camera identification according to some embodiments.

Figure 14:
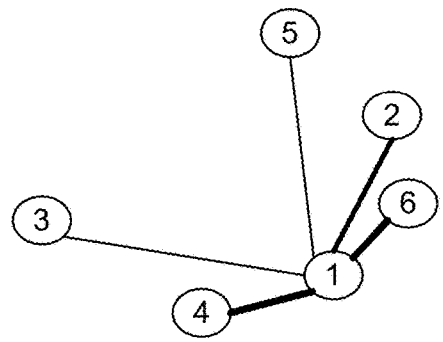
FIG. 14 illustrates an example of correspondence according to some embodiments.

For each camera, the candidates of neighboring cameras by k-NN are found. For all cameras, the candidates are cross validated, and the cameras without any associated candidates by NN are remedied. FIG. 14 illustrates an example of correspondence according to some embodiments. The thickness of an edge is proportional to the measure of correspondences between the two cameras. $C_4$ and $C_6$ are the neighbors of $C_1$. $C_2$ is also considered a neighbor of $C_1$ by 3-NN.

Figure 15:
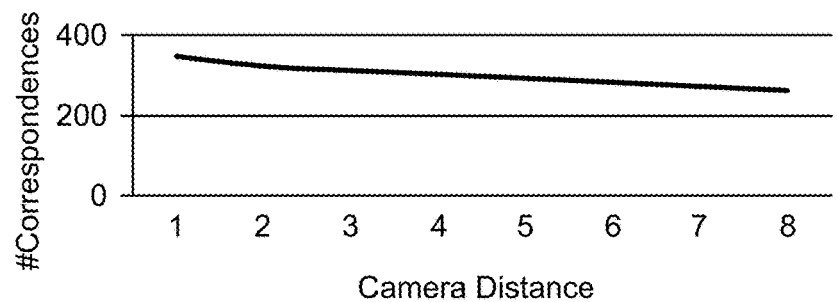
FIG. 15 illustrates an example of $M_{ij}$'s for camera i respective to the distances between camera i and camera j according to some embodiments.

For neighboring camera identification, the number of correspondences between two cameras are measured since under the inward constraint, the overlap areas between two cameras is proportional to the camera distance. FIG. 15 illustrates an example of $M_{ij}$'s for camera i respective to the distances between camera i and camera j according to some embodiments. #$M_{ij}$ is used because of the closeness of camera i and j $\propto$ #$M_{ij}$.

The neighboring camera identification receives all $M_{ij}$'s from the pairwise camera correspondence extraction as input. The #$M_{ij}$ is counted for all combinations of i and j. #$M_{ij}$ is assumed to equal #$M_{ji}$ so only N(N−1)/2 camera pairs are calculated, although $M_{ij}$ does not equal $M_{ji}$. For camera i, its k-NN cameras are found according to the largest #$M_{ij}$'s. Cross-validation is performed so a k-NN camera j of i is kept if i is also a k-NN camera of j. The kept cameras are referred to as the neighbors of camera i. If a camera i has no neighbors found in the cross-validation step, camera j is kept with the largest #$M_{ij}$ as its only neighbor. An $N_c \times N_c$ binary map P is output. Each row i represents the neighboring cameras of $C_i$, e.g., P(i,j)=1 if camera j is a neighboring camera of camera i.

Neighboring camera positioning (308) is used to extract the local relative positions between the neighboring camera pairs and is able to be used for inferring camera topology or constraining the camera parameter/3D structure computations (e.g., SfM). The neighboring camera positioning decides the relative position (left or right) between each neighboring camera pair output by neighboring camera identification. All roll angles are equal to zero. Only slight tilt angles so the horizon is roughly at the middle of the image height are used. The upper half of the background is used which is assumed to be higher than the ground.

FIG. 16 illustrates a diagram of an undirected graph to a directed graph according to some embodiments. Although some neighboring connections may be missed, there is a trade-off between the larger k-NN and computational efficiency. If sign(v_move−v_bg)=0, $P_{LR}(i,j)$=0 is kept and camera list topology deduction is able to recover it.

In the neighboring camera positioning, motion disparity between the background and the moving objects is determined since the depths of moving objects should be shorter than most background areas. The parallax between two cameras leads them to different degree of position changes. It is also valid to use only background motions if the inward constraint is strictly followed.

In the neighboring camera positioning, a moving object area R from background extraction, all $M_{ij}$'s from pairwise camera correspondence extraction, and P from neighboring camera identification are inputs.

```
For each P(i,j) = true,
    for each correspondence m ∈M_ij
    //compute the x-coordinate difference between the
    two keypoints of m
        direction(m) = x-coordinate(k_{j,m}) − x-coordinate(k_{i,m});
    End
End
```

Figure 17:
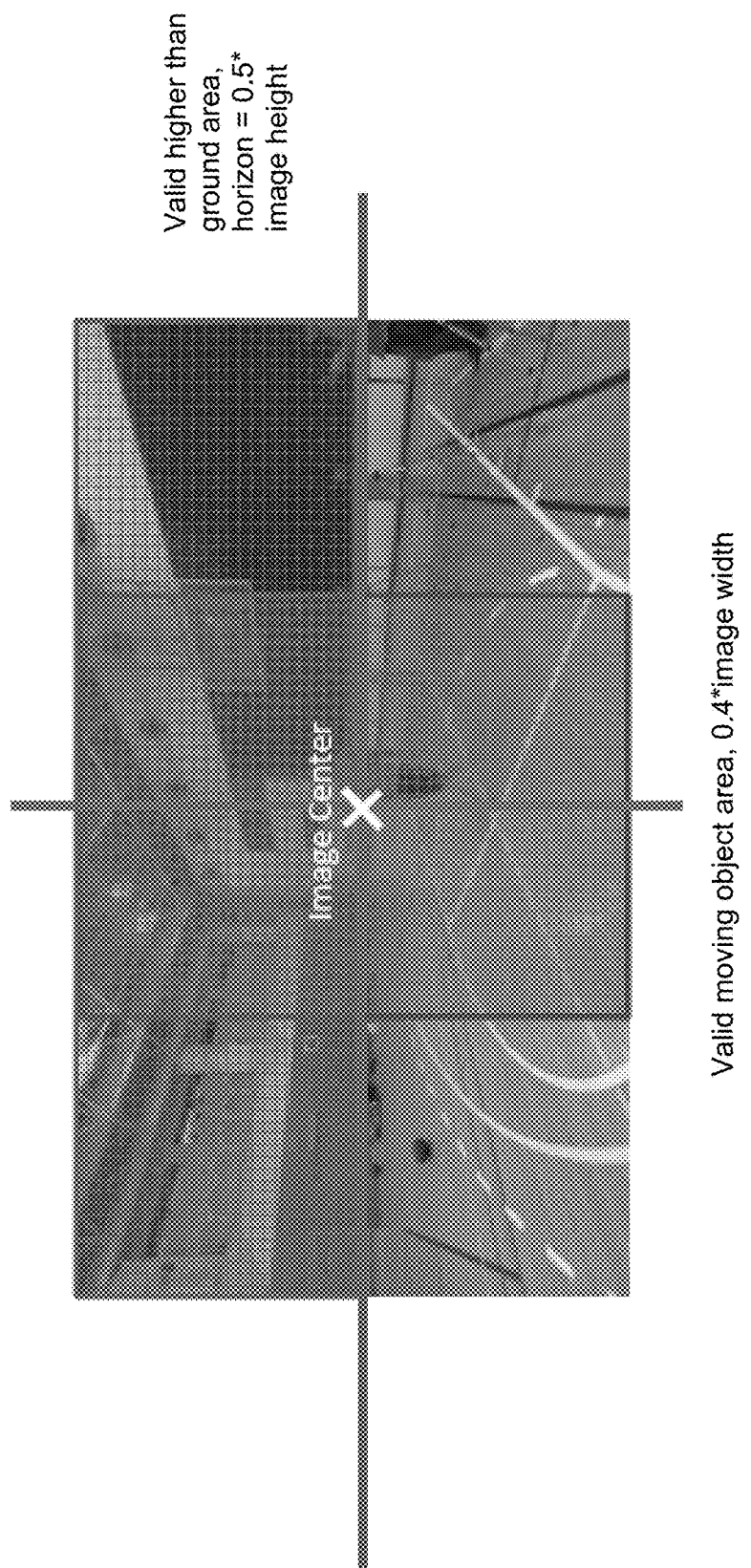
FIG. 17 illustrates an image separated into sections according to some embodiments.

FIG. 17 illustrates an image separated into sections according to some embodiments.

For all m's ⊂ R, 0.3*image width<=x-coordinate($k_{j,m}$), x-coordinate ($k_{i,m}$)<=0.7*image width, compute v-move=mean(direction(m));

For all m's ⊂ R, 0.5*image height>=x-coordinate($k_{j,m}$), x-coordinate ($k_{i,m}$), the major direction d is decided by the larger #(direction(m)>0 and #(direction(m)<0). Compute v_bg=mean(direction(m)∈d);

$$P_{LR}(i,j)=\text{sign}(v\_move-v\_bg);$$

The output is a tri-valued $N_c \times N_c$ matrix $P_{LR}$. $P_{LR}(i,j)=1$ if camera j is left to camera i; $P_{LR}(i,j)=-1$ if camera j is right to camera i; otherwise 0.

Figure 18:
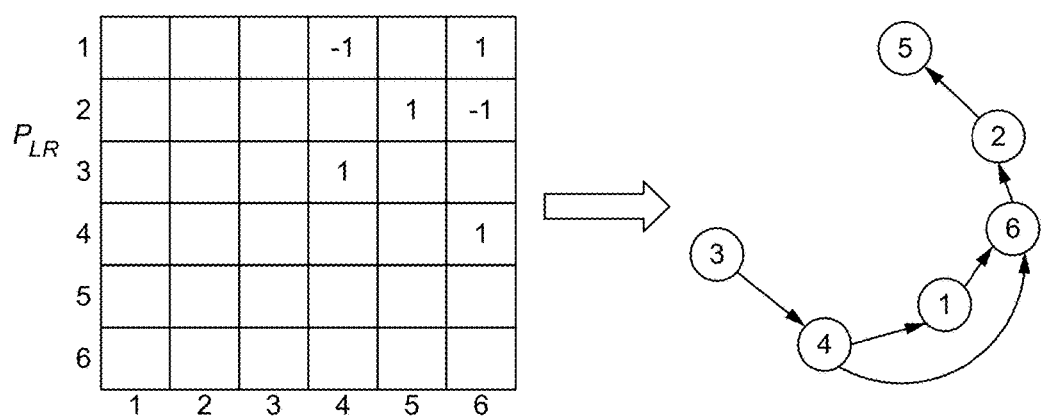
FIG. 18 illustrates an example of $P_{LR}$ defining a unique directed graph according to some embodiments.

$P_{LR}$ defines a unique directed graph. FIG. 18 illustrates an example of $P_{LR}$ defining a unique directed graph according to some embodiments.

Topology deduction (310) includes multiple substeps: relational swapping with loop resolving, nearest neighbor refinement and post-relational swapping. Topology deduction enables the derivation of the global ordering of cameras by the local pairwise directional relations and error detection and recovery.

Figure 19:
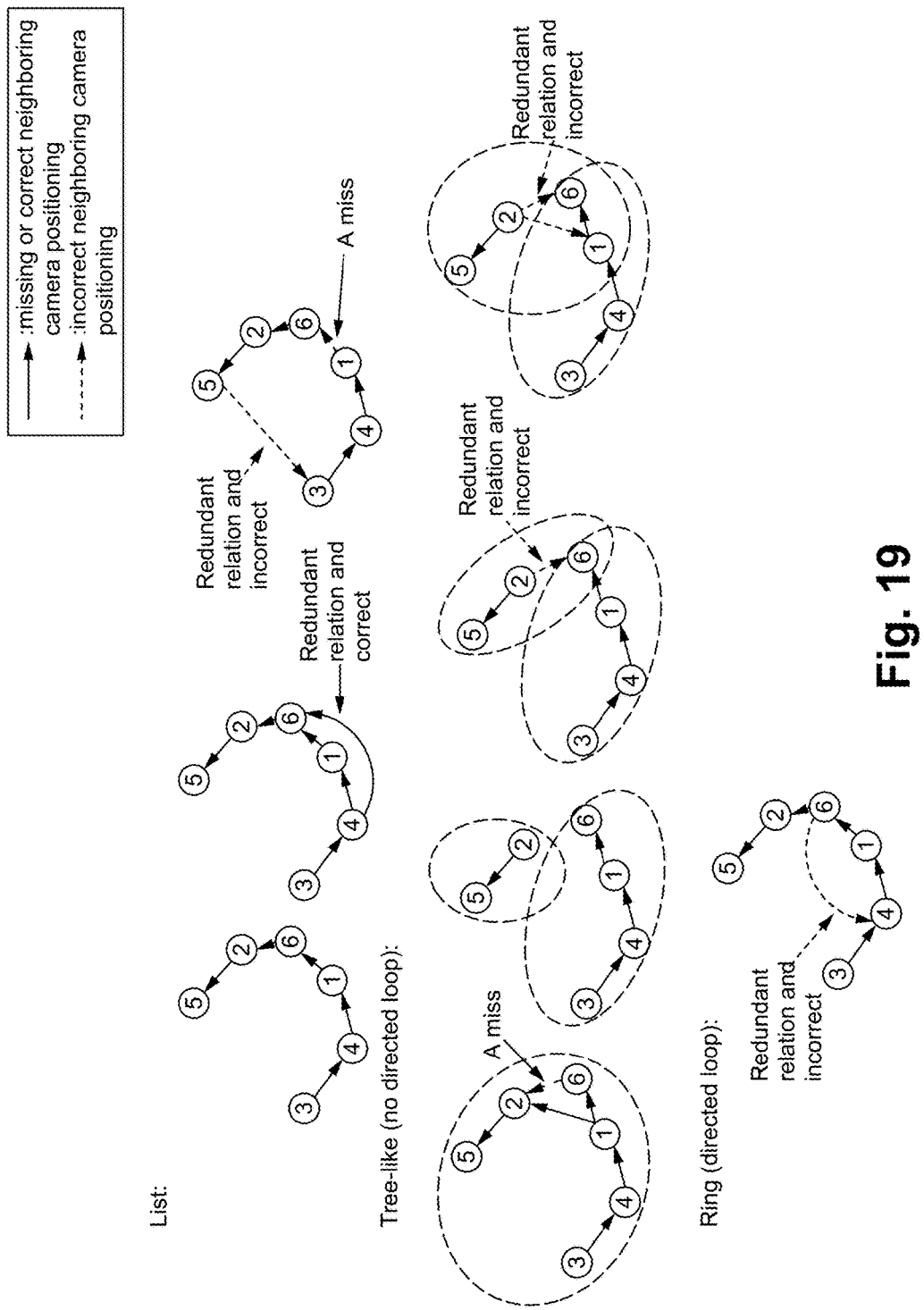
FIG. 19 illustrates multiple types of topologies by $P_{LR}$ according to some embodiments.

FIG. 19 illustrates multiple types of topologies by $P_{LR}$ according to some embodiments. This list topology is preferred. Tree-like (no directed loop) topology may miss some camera relations or contain errors. Ring (directed loop) topology may have at least one error relation. A whole graph is able to be a combination of the three types.

Relational swapping with loop resolving starts from an arbitrary camera ordering, checks each pair(i,j) where $P_{LR}(i,j)\neq 0$. For each checked (i,j), swap the ordering of camera i and j if their relative position mismatches $P_{LR}(i,j)$ in the neighboring camera position step, record the relative direction $P_{LR}(i,j)$ at i and j; propagate the farther cameras IDs (camera ID=i for $C_i$) and directions to j from i which have the same relative direction as $P_{LR}(i,j)$; if a camera has both right and left relative directions recorded in j, there is a loop, and solve the loop by removing the weakest $P_{LR}(i,j)$ in the loop, and clear all propagated recorded. Repeat the process until there is no change or the maximum number of iterations is met. Topology T is the output. $P_{LR}$ is the only input defining the graph, directing the swapping, and giving the relations to be propagated.

Figure 20:
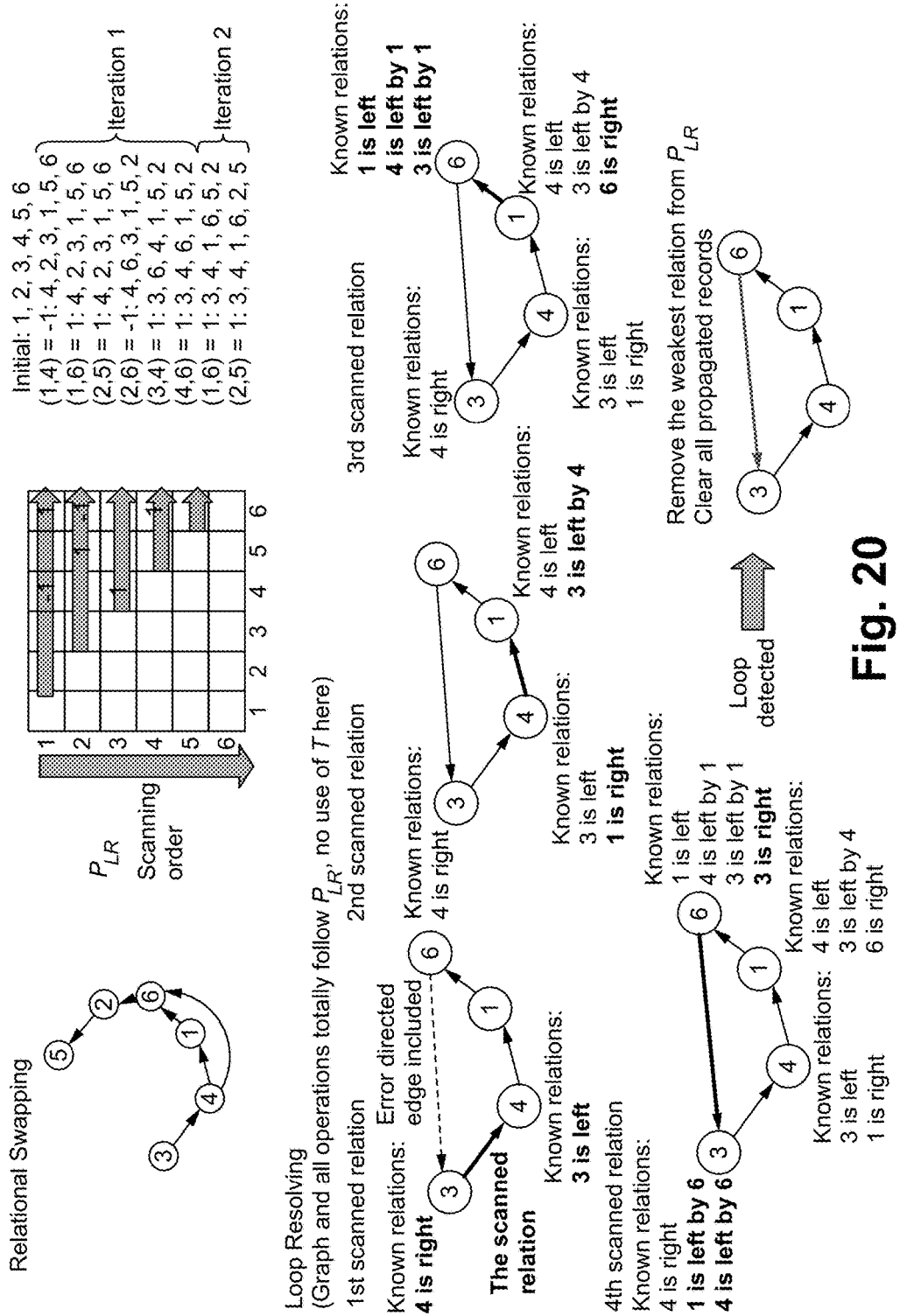
FIG. 20 illustrates diagrams of relational swapping with loop resolving according to some embodiments.

FIG. 20 illustrates diagrams of relational swapping with loop resolving according to some embodiments.

Relational swapping with loop resolving receives $P_{LR}$ and all $M_{ij}$'s by pairwise camera correspondence extraction as inputs.

```
Initial T_0 = 1...N_c;
changed = false;
While ite < max_ite
    for i = 1...N_c
        for j = i+1...N_c
            if P_LR (i,j) ≠ 0
                Swap i,j in T_0 if the position ordering of C_iC_j is
                    wrong
                Propagate the recorded camera Ids at i to j if they
    are at the opposite directions of i
                    Each camera maintains a record of camera Ids and
    their relative directions propagated
                end
            end
        end
    if !changed
        break;
    else
        ite++; changed = false;
    end
end
```

The output is $T_0$ (an ordering list of all cameras) and a modified $P_{LR}$.

Nearest neighbor refinement is used to resolve the tree-like topologies after relational swapping with loop resolving. Given $T_0$ from relational swapping with loop resolving, it is not unique if the relations by $P_{LR}$ are not sufficient (tree-like). FIG. 21 illustrates a diagram of neighbor refinement according to some embodiments. By introducing the neighboring camera position the possible solutions are constrained. Two types of information are used to recover the unique solution. $P_{LR}$ based on k-NN implies the ordering difference between the neighboring cameras and has an upper bound of k/2. $M_{ij}$ is able to be upgraded to directional relation as another constraint.

In the nearest neighbor refinement, only the Tree-like $P_{LR}$ activates the inner code (the if statement). The input is $T_0$ from relational swapping with loop resolving, $P_{LR}$ after relational swapping with loop resolving, $M_{ij}$'s from pairwise camera correspondence extraction.

```
While
    cost_origin using the current P_LR
    check all consecutive cameras in T_0 and compute their directions if their corresponding
    P_LR = 0 (a missing)
        for i = 1:#Cams
            for j = i+1..#Cams
                if P_LR(i,j) but the positions of camera i and camera j are farther than 2
                    Generate 4 possible rearrangements, T_tmp(1) to T_tmp(4) with neighbor
    window size = 2
                        for k = 1:4
                            compute cost_after(k) for each rearrangement;
                        end
                    Choose the best k which has the largest drop from cost_origin to
    cost_after(k):
                        (1) if only one best T_tmp(k), cost_after(k )< cost_origin, choose it
                        (2) if the cost_origin=cost_after(k), further compute the #direction errors
    of the missing data ing T_tmp(k), and then decide if T_tmp(k) is used,
                        (3) if multiple best k's, also compute the #direction errors of the missing
    data for these T_tmp(k)'s to choose the best one.
                            Re-assign T_0 as T_tmp(k);
                            Update cost_origin;
                end
            end
        end
    end
```

The neighbor refinement receives $P_{LR\_z}$ as input. The cost equals positioning error (direction error and neighboring error). Define ordering(i)=position of camera i in the camera list topology T, counted from left to right:

e.g., ordering (i)=2,
  ordering (k)=3, _i k_____j___
  ordering (j)=8.

Direction error of $$P_{LR}(i, j) = \begin{cases} 1, & if P_{LR}(i, j) \text{ mismatches sign}\left(\dfrac{ordering(i) -}{ordering(j)}\right) \\ 0, & otherwise \end{cases}$$

Neighboring error of $$P_{LR}(i, j) = \begin{cases} 1, & if abs(ordering(i) - ordering(j)) > D\_th \\ 0, & otherwise \end{cases},$$

D_th=ceil(k/2), where k is the k-NN cost=$\Sigma_{\forall i,j, i \neq j}$(direction error of $P_{LR}(i, j)$+neighboring error of $P_{LR}(i, j)$)

e.g., $P_{LR}$ (i,k)=1, $D\_th$=2

FIG. 22 illustrates a diagram of neighbor refinement according to some embodiments.

If two cameras $C_i$ and $C_j$ are neighbors in a camera list topology T, so abs(ordering(i)−ordering(j))=1, then $P_{LR}$(i,j) is a missing data if $P_{LR}$(i,j)=0 . FIG. 23 illustrates a diagram indicating missing data according to some embodiments. For any missing data $P_{LR}$(i,j) in T, $P_{LR}$(i,j)=0. If two topologies T and T' have the same costs, neighboring camera positioning without k-NN constraint is used to estimate the relative directions of all missing data, $\tilde{P}_{LR}$(i,j)'s=±1, in T and T', respectively, and more direction errors are able to be compared. However, $P_{LR}$(i,j)=0 implies P(i,j)=0 so such relations are weak and their neighboring errors are ignored. $\tilde{P}_{LR}$(i, j)'s is used temporarily and keep $P_{LR}$(i,j)=0.

Figure 24:
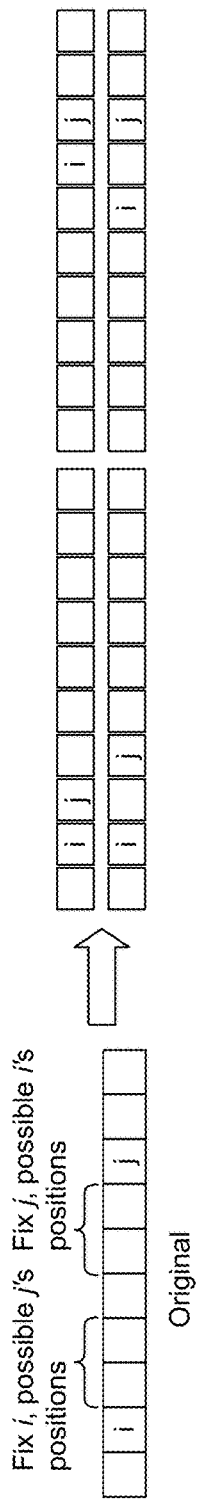
FIG. 24 illustrates a diagram of rearrangement according to some embodiments.
Figure 25:
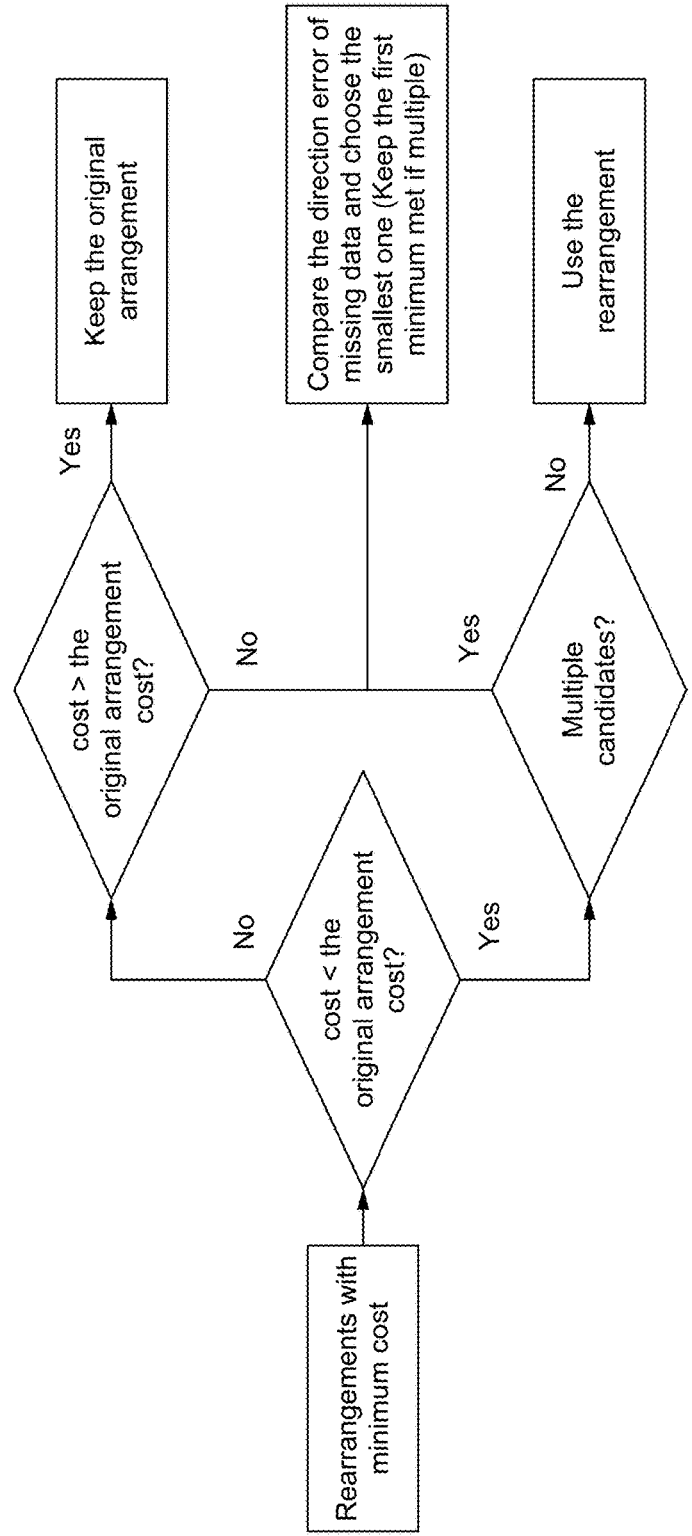
FIG. 25 illustrates a flowchart of rearrangement according to some embodiments.
Figure 26:
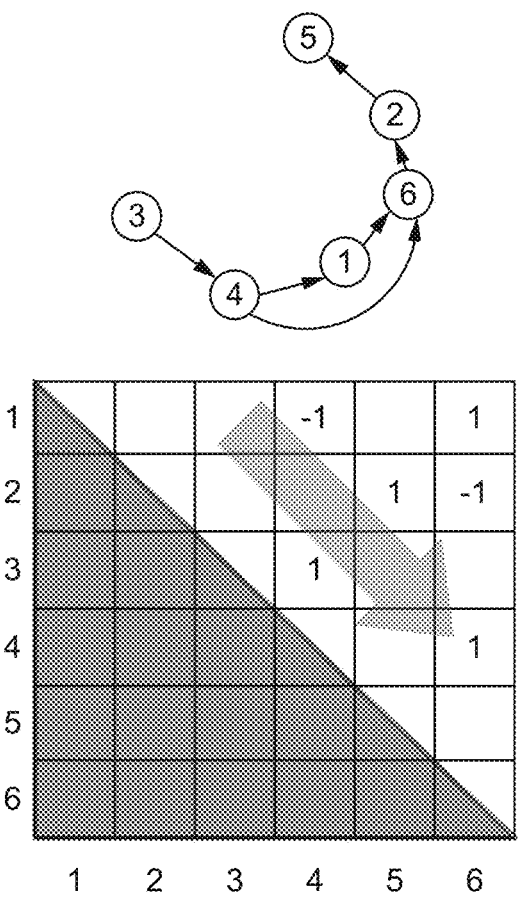
FIG. 26 illustrates a diagram of convergence according to some embodiments.

By 3-NN, the costs of 4 possible rearrangements are compared (e.g., $P_{LR}$(i,j)=−1, so i is left to j, NN window size=ceil(3/2)=2). FIG. 24 illustrates a diagram of rearrangement according to some embodiments. FIG. 25 illustrates a flowchart of rearrangement according to some embodiments.

In post-relational swapping, relational swapping without loop resolving is implemented. This is refinement after nearest neighbor refinement. Input is $T_1$ from nearest neighbor refinement and $P_{LR}$ from relational swapping with loop resolving. The output is T.

Figure 27:
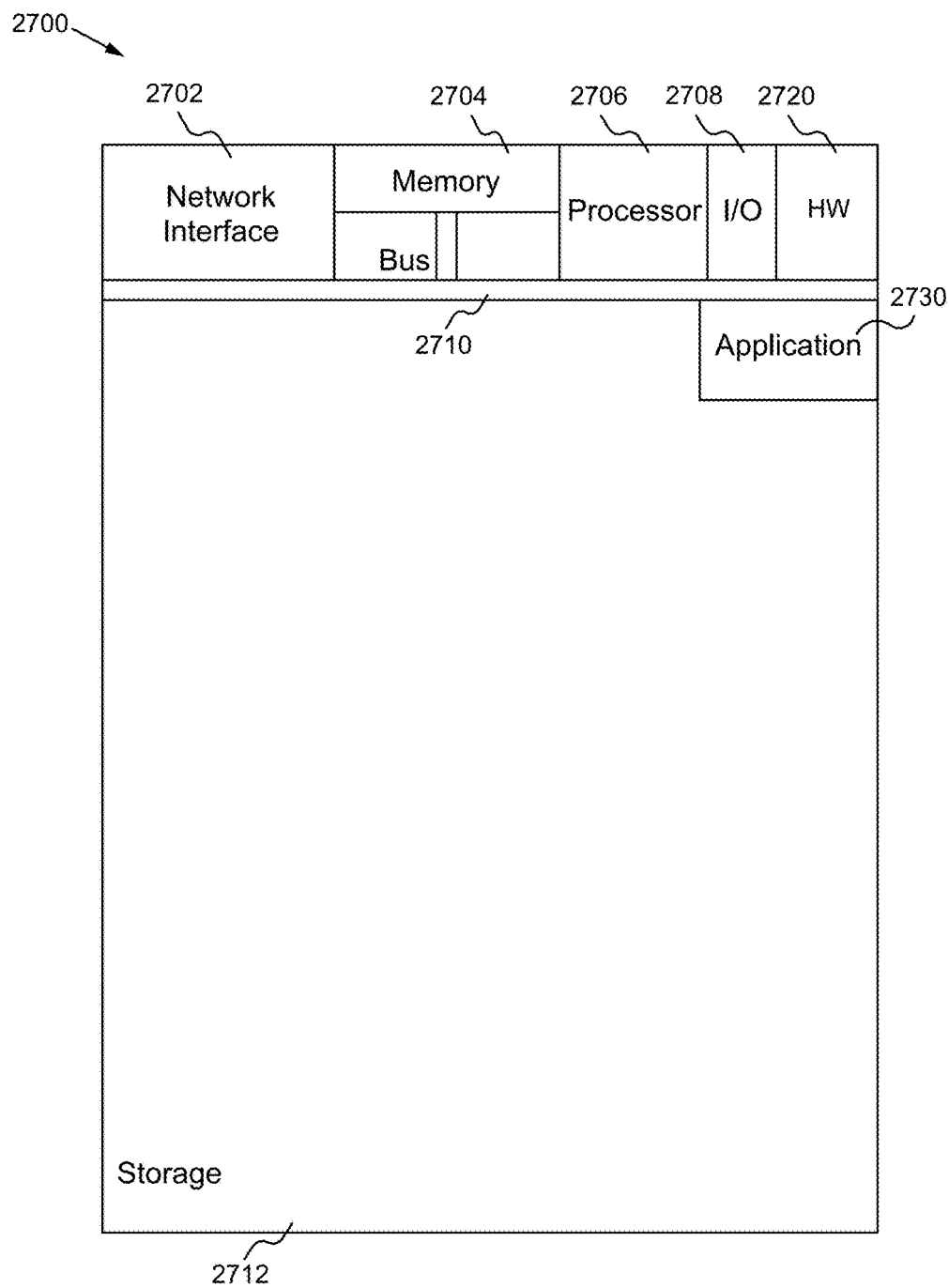
FIG. 27 illustrates a block diagram of an exemplary computing device configured to implement the camera location ordering method according to some embodiments.

FIG. 27 illustrates a block diagram of an exemplary computing device configured to implement the camera location ordering method according to some embodiments. The computing device 2700 is able to be used to acquire, store, compute, process, communicate and/or display information such as images and videos. In general, a hardware structure suitable for implementing the computing device 2700 includes a network interface 2702, a memory 2704, a processor 2706, I/O device(s) 2708, a bus 2710 and a storage device 2712. The choice of processor is not critical as long as a suitable processor with sufficient speed is chosen. The memory 2704 is able to be any conventional computer memory known in the art. The storage device 2712 is able to include a hard drive, CDROM, CDRW, DVD, DVDRW, High Definition disc/drive, ultra-HD drive, flash memory card or any other storage device. The computing device 2700 is able to include one or more network interfaces 2702. An example of a network interface includes a network card connected to an Ethernet or other type of LAN. The I/O device(s) 2708 are able to include one or more of the following: keyboard, mouse, monitor, screen, printer, modem, touchscreen, button interface and other devices. Camera location ordering application(s) 2730 used to perform the camera location ordering method are likely to be stored in the storage device 2712 and memory 2704 and processed as applications are typically processed. More or fewer components shown in FIG. 27 are able to be included in the computing device 2700. In some embodiments, camera location ordering hardware 2720 is included. Although the computing device 2700 in FIG. 27 includes applications 2730 and hardware 2720 for the camera location ordering method, the camera location ordering method is able to be implemented on a computing device in hardware, firmware, software or any combination thereof. For example, in some embodiments, the camera location ordering applications 2730 are programmed in a memory and executed using a processor. In another example, in some embodiments, the camera location ordering hardware 2720 is programmed hardware logic including gates specifically designed to implement the camera location ordering method.

In some embodiments, the camera location ordering application(s) 2730 include several applications and/or modules. In some embodiments, modules include one or more sub-modules as well. In some embodiments, fewer or additional modules are able to be included.

In some embodiments, the camera location ordering hardware 2720 includes camera components such as a lens, an image sensor, and/or any other camera components.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, smart jewelry (e.g., smart watch) or any other suitable computing device.

Figure 28:
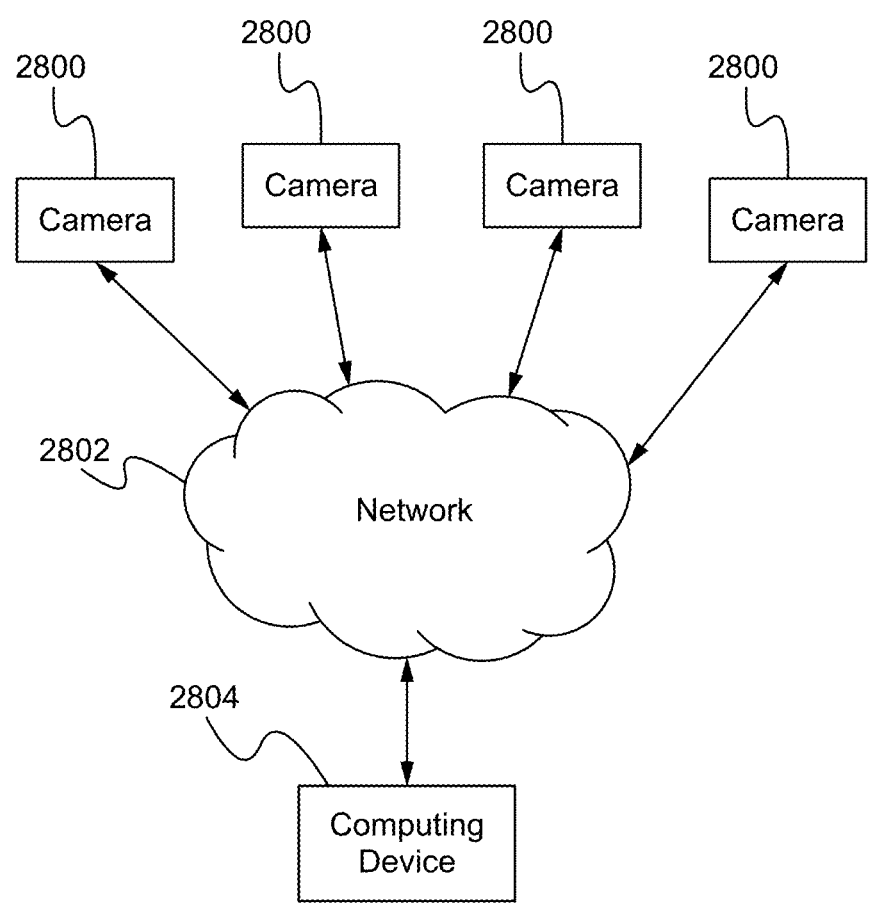
FIG. 28 illustrates a diagram of a network of devices according to some embodiments.

FIG. 28 illustrates a diagram of a network of devices according to some embodiments. A plurality of cameras 2800 are utilized to acquire image/video content. The image/video content is transmitted through a network 2802 (e.g., the Internet, a cellular network or any other network) to a computing device 2804. In some embodiments, the content is transmitted to the computing device directly without a network. The computing device 2804 is configured to perform the camera location ordering method described herein. The computing device 2804 is able to be any device such as a server, a personal computer, a smart phone, or any of the devices described herein or any combination of devices described herein. In some embodiments, the computing device 2804 is one or more of the plurality of cameras 2800. In other words, the camera(s) 2800 implements the camera location ordering method.

To utilize the camera location ordering method described herein, devices such as digital cameras/camcorders are used to acquire images/videos. The camera location ordering method is automatically used for arranging videos captured by the cameras/camcorders by time and/or space. The camera location ordering method is able to be implemented with user assistance or automatically without user involvement.

In operation, the camera location ordering method arranges videos captured by multiple cameras by time and/or space. The camera location ordering method is able to be applied to (1) interactive camera selection to view the same event from different viewing angles, (2) automatic camera network organization in video surveillance, (3) automatic organization of video stocks according to their captured locations, and (4) as a preprocessing stage before SfM to achieve a faster camera network positioning, which is able to be use in 3D sports video, view interpolation and point clouds generation.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a non-transitory memory of a device comprising:
   a. performing background extraction, wherein performing background extraction generates a background extraction output including a moving object region of a camera;
   b. performing pairwise camera correspondence extraction, wherein performing pairwise camera correspondence extraction utilizes the background extraction output and an image as input;
   c. identifying neighboring cameras;
   d. determining neighboring camera positioning; and
   e. performing camera list topology deduction.

2. The method of claim 1 further comprising preparing settings and input.

3. The method of claim 1 wherein performing background extraction includes background modeling and determining reliable moving objects.

4. The method of claim 1 wherein performing pairwise camera correspondence extraction includes keypoint detection with subsampling, keypoint descriptor extraction and pairwise correspondence.

5. The method of claim 1 wherein performing pairwise camera correspondence extraction outputs corresponding keypoints between a first camera and a second camera.

6. The method of claim 5 wherein identifying neighboring cameras utilizes the keypoints between the first camera and the second camera as input.

7. The method of claim 1 wherein identifying neighboring cameras outputs a binary neighboring camera map.

8. The method of claim 7 wherein determining neighboring camera positioning utilizes a moving object region of a camera, corresponding keypoints between a first camera and a second camera and the binary neighboring camera map as input.

9. The method of claim 8 wherein determining neighboring camera positioning outputs a neighboring camera relative direction map.

10. The method of claim 1 wherein topology deduction includes relational swapping with loop resolving, nearest neighbor refinement and post-relational swapping.

11. The method of claim 1 wherein topology deduction utilizes a neighboring camera relative direction map and corresponding keypoints between a first camera and a second camera as input.

12. The method of claim 1 wherein topology deduction outputs a camera list topology.

13. A system comprising:
   a. a plurality of camera devices each configured for capturing video content; and
   b. a computing device configured for:
      i. receiving the video content;
      ii. performing background extraction of the video content, wherein performing background extraction generates a background extraction output including a moving object region of a camera;
      iii. performing pairwise camera correspondence extraction, wherein performing pairwise camera correspondence extraction utilizes the background extraction output and an image as input;
      iv. identifying neighboring cameras of the plurality of camera devices;
      v. determining neighboring camera positioning; and
      vi. performing camera list topology deduction.

14. The system of claim 13 wherein the computing device is further configured for preparing settings and input.

15. The system of claim 13 wherein performing background extraction includes background modeling and determining reliable moving objects.

16. The system of claim 13 wherein performing pairwise camera correspondence extraction includes keypoint detection with subsampling, keypoint descriptor extraction and pairwise correspondence.

17. The system of claim 13 wherein performing pairwise camera correspondence extraction outputs corresponding keypoints between a first camera and a second camera.

18. The system of claim 17 wherein identifying neighboring cameras utilizes the keypoints between the first camera and the second camera as input.

19. The system of claim 13 wherein identifying neighboring cameras outputs a binary neighboring camera map.

20. The system of claim 19 wherein determining neighboring camera positioning utilizes a moving object region of a camera, corresponding keypoints between a first camera and a second camera and the binary neighboring camera map as input.

21. The system of claim 20 wherein determining neighboring camera positioning outputs a neighboring camera relative direction map.

22. The system of claim 13 wherein topology deduction includes relational swapping with loop resolving, nearest neighbor refinement and post-relational swapping.

23. The system of claim 13 wherein topology deduction utilizes a neighboring camera relative direction map and corresponding keypoints between a first camera and a second camera as input.

24. The system of claim 13 wherein topology deduction outputs a camera list topology.

25. A camera device comprising:
   a. a lens;
   b. a sensor configured for acquiring video content;
   c. a non-transitory memory for storing an application, the application for:
      i. receiving the video content;
      ii. performing background extraction of the video content, wherein performing background extraction generates a background extraction output including a moving object region of the camera device;

iii. performing pairwise camera correspondence extraction, wherein performing pairwise camera correspondence extraction utilizes the background extraction output and an image as input;
iv. identifying neighboring cameras of the plurality of camera devices;
v. determining neighboring camera positioning; and
vi. performing camera list topology deduction; and
d. a processing component coupled to the memory, the processing component configured for processing the application.

26. The camera device of claim 25 wherein the application is further configured for preparing settings and input.

27. The camera device of claim 25 wherein performing background extraction includes background modeling and determining reliable moving objects.

28. The camera device of claim 25 wherein performing pairwise camera correspondence extraction includes keypoint detection with subsampling, keypoint descriptor extraction and pairwise correspondence.

29. The camera device of claim 25 wherein performing pairwise camera correspondence extraction outputs corresponding keypoints between a first camera and a second camera.

30. The camera device of claim 29 wherein identifying neighboring cameras utilizes the keypoints between the first camera and the second camera as input.

31. The camera device of claim 25 wherein identifying neighboring cameras outputs a binary neighboring camera map.

32. The camera device of claim 31 wherein determining neighboring camera positioning utilizes a moving object region of a camera, corresponding keypoints between a first camera and a second camera and the binary neighboring camera map as input.

33. The camera device of claim 32 wherein determining neighboring camera positioning outputs a neighboring camera relative direction map.

34. The camera device of claim 25 wherein topology deduction includes relational swapping with loop resolving, nearest neighbor refinement and post-relational swapping.

35. The camera device of claim 25 wherein topology deduction utilizes a neighboring camera relative direction map and corresponding keypoints between a first camera and a second camera as input.

36. The camera device of claim 25 wherein topology deduction outputs a camera list topology.

37. A method programmed in a non-transitory memory of a device comprising:
a. performing background extraction;
b. performing pairwise camera correspondence extraction;
c. identifying neighboring cameras, wherein identifying the neighboring cameras outputs a binary neighboring camera map;
d. determining neighboring camera positioning; and
e. performing camera list topology deduction.

38. The method of claim 37 further comprising preparing settings and input.

39. The method of claim 37 wherein performing background extraction includes background modeling and determining reliable moving objects.

40. The method of claim 37 wherein performing background extraction generates a background extraction output including a moving object region of a camera.

41. The method of claim 40 wherein performing pairwise camera correspondence extraction utilizes the background extraction output and an image as input.

42. The method of claim 37 wherein performing pairwise camera correspondence extraction includes keypoint detection with subsampling, keypoint descriptor extraction and pairwise correspondence.

43. The method of claim 37 wherein performing pairwise camera correspondence extraction outputs corresponding keypoints between a first camera and a second camera.

44. The method of claim 43 wherein identifying neighboring cameras utilizes the keypoints between the first camera and the second camera as input.

45. The method of claim 37 wherein determining neighboring camera positioning utilizes a moving object region of a camera, corresponding keypoints between a first camera and a second camera and the binary neighboring camera map as input.

46. The method of claim 37 wherein determining neighboring camera positioning outputs a neighboring camera relative direction map.

47. The method of claim 37 wherein topology deduction includes relational swapping with loop resolving, nearest neighbor refinement and post-relational swapping.

48. The method of claim 37 wherein topology deduction utilizes a neighboring camera relative direction map and corresponding keypoints between a first camera and a second camera as input.

49. The method of claim 37 wherein topology deduction outputs a camera list topology.

* * * * *